March 16, 1948. R. E. PAGE ET AL 2,438,071
PERFORATED CARD CONTROLLED ALPHABET AND NUMERAL PRINTER
Filed Dec. 23, 1944 9 Sheets-Sheet 1

INVENTORS
Ralph E. Page
Horace S. Beattie
BY
W. M. Wilson
ATTORNEY

March 16, 1948.   R. E. PAGE ET AL   2,438,071
PERFORATED CARD CONTROLLED ALPHABET AND NUMERAL PRINTER
Filed Dec. 23, 1944   9 Sheets-Sheet 2
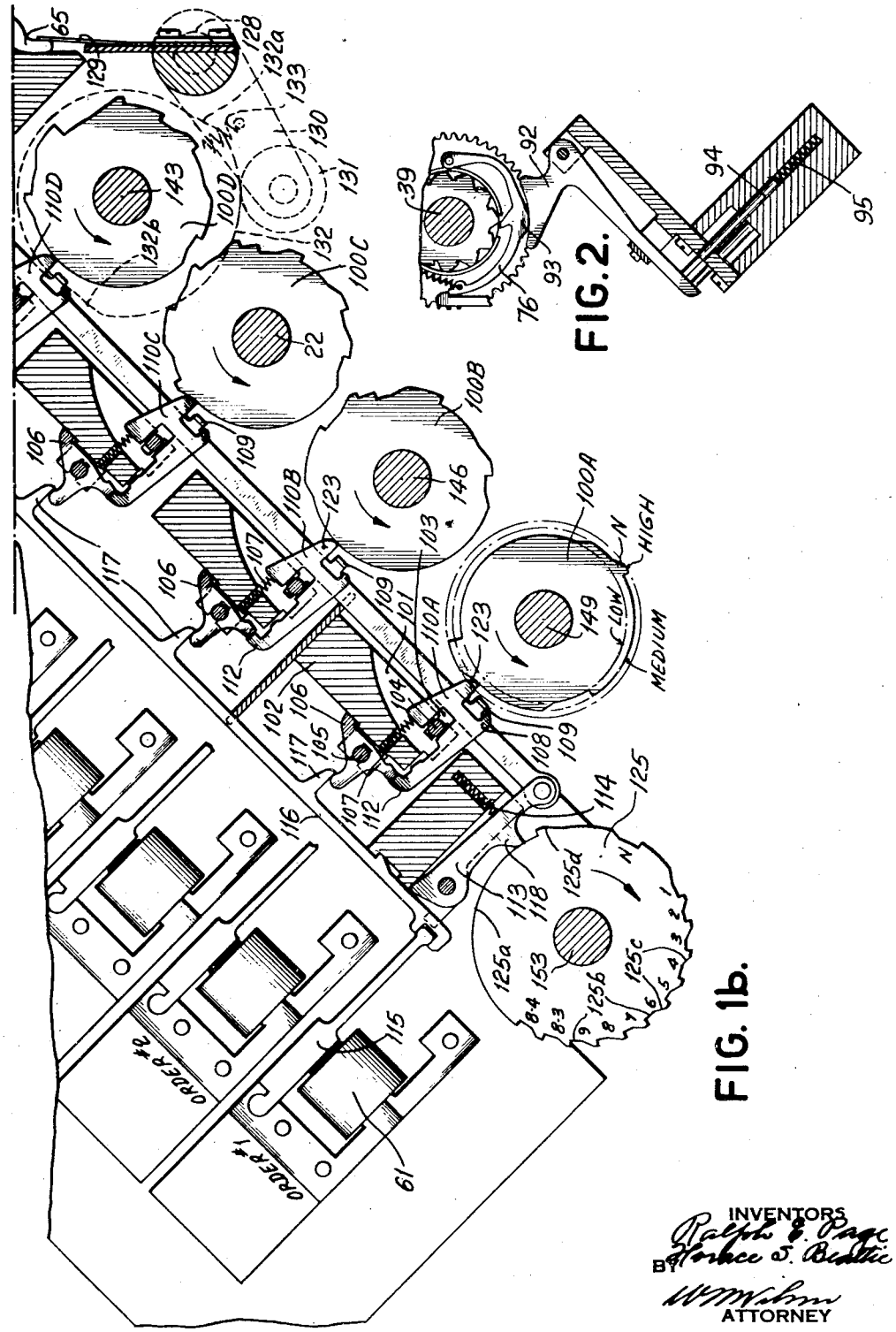

March 16, 1948. R. E. PAGE ET AL 2,438,071
PERFORATED CARD CONTROLLED ALPHABET AND NUMERAL PRINTER
Filed Dec. 23, 1944 9 Sheets-Sheet 5

INVENTORS
ATTORNEY

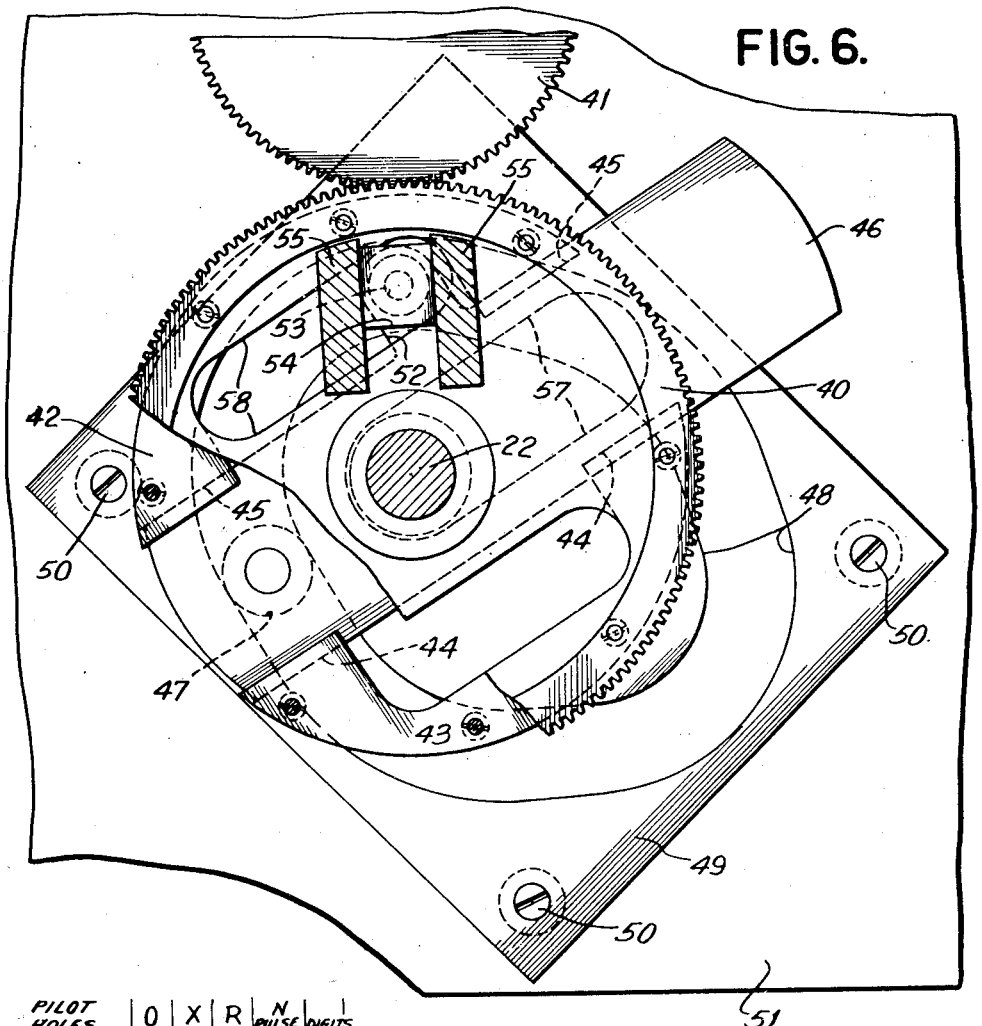

March 16, 1948.    R. E. PAGE ET AL    2,438,071
PERFORATED CARD CONTROLLED ALPHABET AND NUMERAL PRINTER
Filed Dec. 23, 1944    9 Sheets-Sheet 7

INVENTORS
Ralph E. Page
Horace S. Beattie
BY
W. M. Wilson
ATTORNEY

March 16, 1948.  R. E. PAGE ET AL  2,438,071
PERFORATED CARD CONTROLLED ALPHABET AND NUMERAL PRINTER
Filed Dec. 23, 1944  9 Sheets—Sheet 9

INVENTORS
Ralph E. Page
Horace S. Beattie
BY
W. M. Wilson
ATTORNEY

Patented Mar. 16, 1948

2,438,071

UNITED STATES PATENT OFFICE 2,438,071

PERFORATED CARD CONTROLLED ALPHABET AND NUMERAL PRINTER

Ralph E. Page, West Orange, N. J., and Horace S. Beattie, Poughkeepsie, N. Y., assignors to International Business Machines Corporation, New York, N. Y., a corporation of New York Application December 23, 1944, Serial No. 569,444

24 Claims. (Cl. 101—93)

This invention relates to printing mechanisms in general and more particularly to the type wherein alphabetic, numeric, or special symbol printing can be performed under control of perforated instrumentalities, such as record cards.

The main object of the invention is to devise a printing mechanism of the above type that has an augmented type printing capacity without requiring additional card holes in a card column. In other words record cards having a limited number of card holes in each column such as 9–O, X, R are capable of selecting by the improved printing mechanism and coordinated control structure more printing type than possible heretofore.

A feature of the present invention is to enable a record card of the 1-9, O, X, R hole type to be utilized to control the improved printing mechanism to select more printing type than possible heretofore.

As in printing mechanisms of the type heretofore devised each of the digit holes 1-9 in combination with O, X, R are also capable of selecting ten digit type and twenty-six alphabetic type, but this prior limitation is exceeded in the present machine by enabling the selection of twelve additional symbols without requiring additional card holes.

An object of the invention is to provide means to select a group of type symbols under control of card perforations appearing in combination such as 8–4, 8–3, for example, and to select type of such group in accordance with the associated O, X, R holes, and in the absence of such O, X, R holes to effect by a machine controlled means the remaining type of such group.

Another object of the invention relates to means operating independently of card holes 1-9 and in the absence of such type group selecting perforations 1-9, or the aforesaid combinations of holes 8-4, 8-3 to select a group of symbol printing type, and to select by the O, X, R holes the particular symbol type desired.

A still further feature and object of the invention is to cause the invariable printing of a special character in the absence of any card holes in a controlling column.

Another object of the invention which has particular relation to the type group selecting means controlled by combinational holes is to incorporate in the machine an improved type of combinational hole translator capable of effecting a combinational setup and subsequent conversion to a differentially timed impulse, mechanical in nature.

Another object relating to the specific construction of the translator is to devise a translator of a rotary type and capable of high speed to control a printing mechanism of a construction operable at such speeds.

In this connection it is an object of the invention to devise a translator for each printing order so that it occupies no more space, as far as its width is concerned, than the controlled printing wheel.

A still further object is to devise parts of each order of the translator so that they be located and conjointly operate in a narrow plane, and wherein the width of each order of the translator is coextensive with the width of other parts of a printing order. The result of the above construction is that the desirability of providing large column printing capacity is not diminished by the provision of the aforesad translator.

The results obtainable from a construction of the improved printing mechanism herein disclosed indicate that the objects have been reached in an admirable and efficient manner. The machine is capable of selecting forty-eight printing type by a printing mechanism of the rotary type providing digit, alphabetic and symbol printing meeting the present character printing requirements. The necessary and desirable characteristics of high speed, efficiency in operation, large column printing capacity, extended character printing capacity, and the capability of being controlled by standard record cards, i. e., those perforated in holes 1-9, O, X, R, have been supplied by the present arrangement.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a and 1b when assembled with Fig. 1a on the top shows the construction of the improved numeric and alphabet printing mechanism.

Fig. 2 is a detail of an overthrow preventing mechanism.

Fig. 6 is a sectional view taken on the line 6—6 of Fig. 4.

Fig. 7 represents the card perforation code and illustrates the alphabetic, numeric characters and other symbols selected by perforations appearing in a column, singly or in combination.

Card feeding and analyzing devices

The card feeding and analyzing devices employed to control the improved printing mechanism shown herein are similar in construction and operation to the form disclosed in the patents to J. R. Peirce, No. 1,827,259, dated October 13, 1931; No. 2,042,324, dated May 26, 1936; and No. 2,199,547, dated May 7, 1940.

Figure 10:
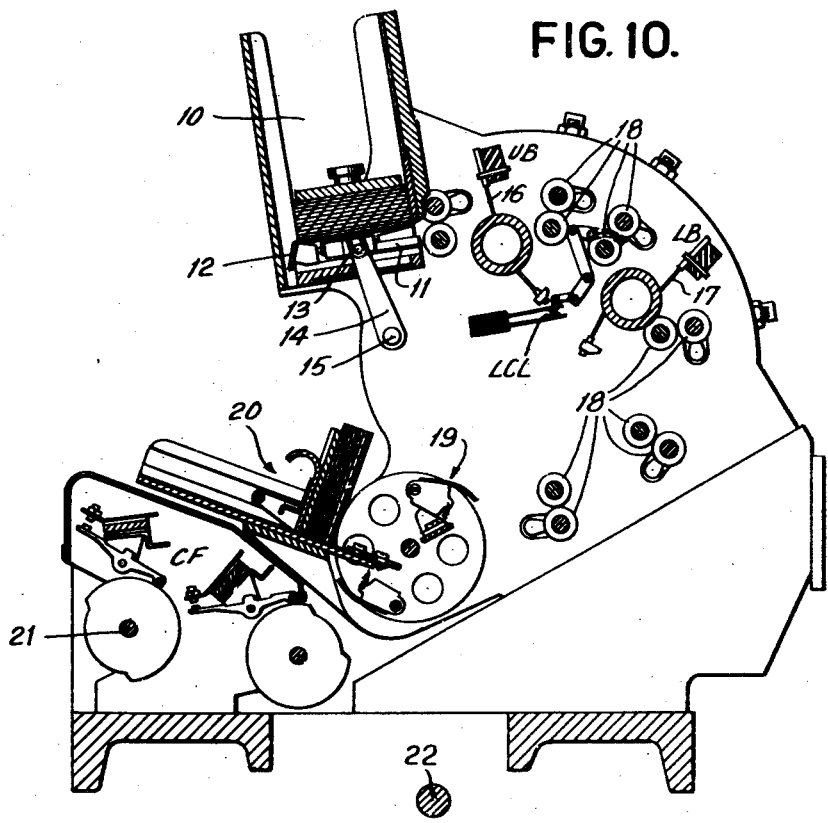
Fig. 10 is a view in side elevation of the card feeding mechanism.

The card feeding mechanism is shown generally herein in Fig. 10. As is well known, card feeding operations are initiated by the usual manual start key so as to cause the energization of a card feed clutch magnet which causes the cards to be fed singly from the supply hopper 10 by the usual card picker mechanism comprising a slidably mounted reciprocable plate 11 carrying a picker knife 12 for cooperation with the record cards. The plate 11 has a pin and slot connection 13 with an arm 14 secured to a rock shaft 15. Shaft 15 is rocked by the card feed operating mechanism to reciprocate picker knife 12 to cause the card to be fed from the supply hopper 10 to the analyzing mechanism and the card is presented in succession to UB analyzing brushes 16 and LB analyzing brushes 17.

The feeding of record cards from station to station and to ejection is effected by pairs of feeding rollers 18 having the customary driving gear connections to the card feed operating mechanism. The cards pass from the last pair of rollers 18 to a card stacker 19, that shown being of the rotary type. The cards are fed to a storage hopper 20 in the original order. As is usual in the form of card feeding mechanism shown, the machine includes cam operated contacts which consist of the CF contacts driven by a shaft 21 which is rotated one revolution for each card feeding cycle.

A constantly running shaft 22 which rotates one revolution for each machine cycle is utilized to operate the CR cam contacts, designated in the wiring diagram, and other parts of the machine.

Interposed between the constantly rotating shaft 22 and the driving shaft of the feed mechanism is the usual card feed clutch magnet (magnet 48 of Fig. 6, Patent No. 2,042,324). The manner of energization of this magnet to initiate and maintain card feeding operations as long as cards are fed is very well known and for this reason is not explained herein in detail.

Figure 8:
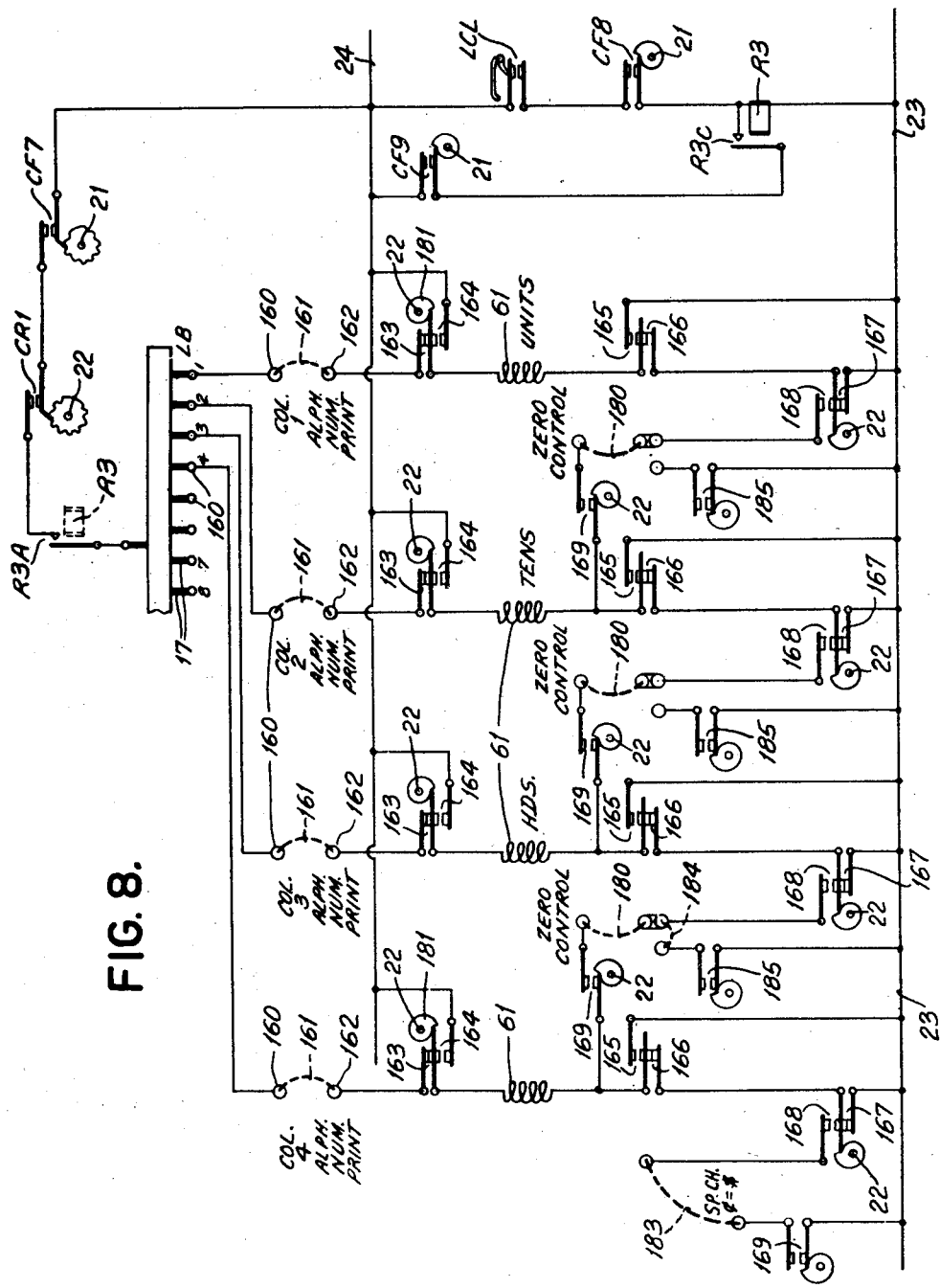
Fig. 8 is an electrical diagram showing the analyzing circuits and the alphabetic and numeric listing circuits controlled by the card perforation analyzing mechanism.

In general, two card feed cycles are initiated by an initial depression of a Start key and a redepression thereof, and the card fed during the second card feed cycle closes card lever contacts LCL. The latter are closed when cam contacts CF8 close at 207° (Fig. 9) and by an obvious circuit an impulse will be directed to relay coil R3 (Fig. 8).

Relay coil R3 closes its contacts R3C and a stick circuit extends from one side of the line 23 through the R3 magnet, R3C contacts, CF9 cam contacts to the other side of the line 24. If card lever contacts LCL are closed when cam contacts CF9 are open, relay coil R3 will be held energized, the energization of the latter then being effected through the card lever contacts LCL and cam contacts CF8. When relay coil R3 is energized, it will close its contacts R3A, thus connecting the contact roll of the LB analyzing brushes 17 to the circuit breakers CR1 and CF7. As long as card feed operations continue, LCL contacts will remain closed to maintain the energization of the relay coil R3 and the closure of its contacts R3A, rendering the LB analyzing brushes 17 effective. After the second manually initiated card feed cycle, successive card feeding cycles automatically ensue as long as cards are fed. For each passage of a card past the LB analyzing brushes, the improved printing mechanism now to be disclosed in detail is controlled so as to print data represented by the card perforations analyzed.

Figure 1A:
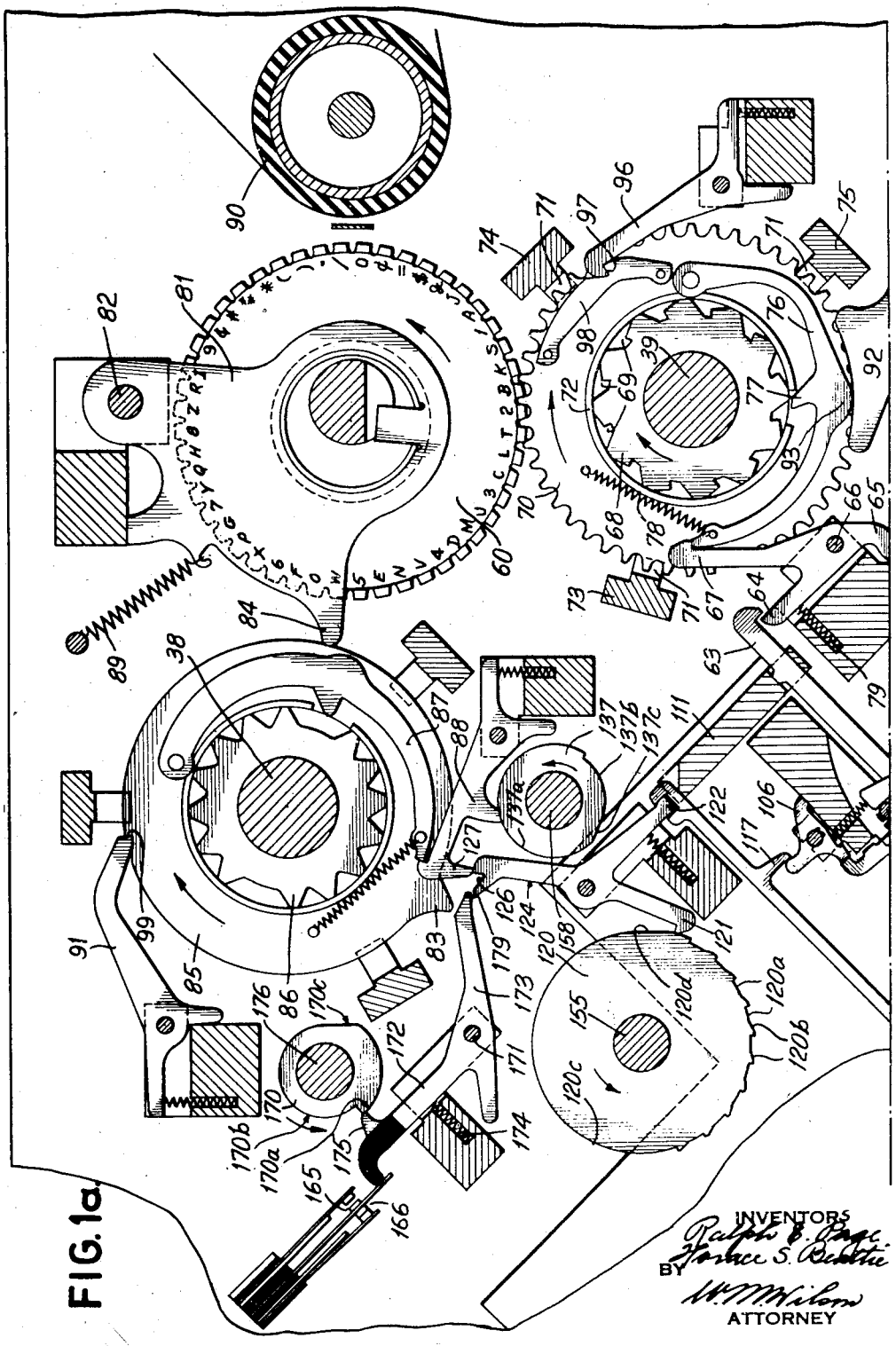

In Fig. 1a reference numeral 38 designates the printing impression drive shaft which is driven with a uniform speed of rotation for each cycle of the operation of the machine. The drive shaft 22 has secured thereto a gear 40 (Figs. 3 and 4) which drives a gear 41 secured to the printing impression drive shaft 58 to rotate the latter at a uniform speed of rotation one end a half revolutions for each revolution of drive shaft 22. Reference numeral 39 designates the type selecting drive shaft which rotates two and one-twelfth revolutions for each operating cycle. At times shaft 39 is driven with a uniform speed of rotation substantially synchronous with the drive shaft 38, but at other times the speed of rotation given to shaft 39 is decreased or increased with respect to the drive shaft 38 for a purpose to be more clearly understood later on. The variable drive for driving shaft 39 at the desired speed will now be described in detail.

Means to drive shaft 39 at variable speeds
(Figs. 3-6)

Figure 3:
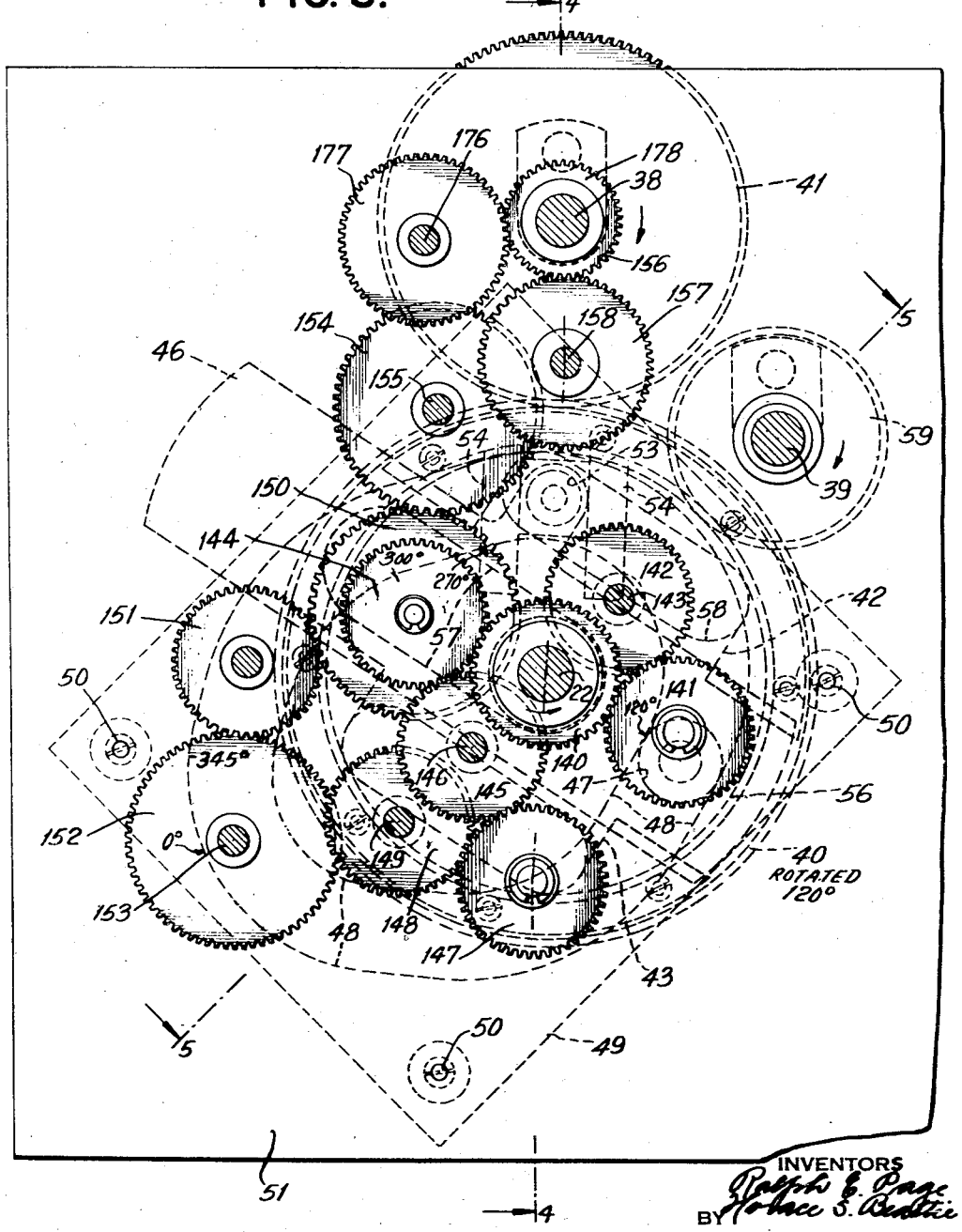
Fig. 3 is a view in side elevation showing the intergearing for driving the driving shafts of the printing mechanism in synchronism.

To the side of the gear 40 and at the periphery thereof there are secured segmental bearing plates 42, 43. The plate 43 is provided with bearing slots 44 and plate 42 with bearing slots 45. Slidably mounted in such bearing slots is a cam follower plate 46. Hence, plates 42, 43 provide the bearing or support for the slidably mounted cam follower plate 46. Obviously, since the gear 40 carries in this manner the cam follower plate 46, the latter rotates with the gear 40 about the shaft 22 in the same counterclockwise direction (Fig. 3).

Cam follower plate 46 carries a cam follower roller 47, fitting in a cam race 48 of a cam plate 49 which is fixed by studs 50 to a stationary frame plate 51. The cam follower plate 46 has an extension 52 (see Figs. 3 and 6) which carries a stud 53 (Fig. 4) and carried by the stud 53 is a square block 54 fitting between plates 55 secured to one side of a gear 56. So far it is obvious that drive shaft 22 drives the gear 40 and through the connecting cam follower plate 46 the gear 56 is driven. The cam race 48 is so designed that the cam follower plate 46 may be moved away from or towards the center of the shaft 22 and to do this without interference the plate 46 has a longitudinal slot 57 (Fig. 6) encircling the shaft 22. Also in view of the movement given to gear 56 at times resulting from the movement given to cam follower plate 46 by the cam race 48 and which movement is relative to the gear 40, the gear 40 has an elongated slot 58 (Fig. 6) through which the stud 53 passes.

The gear 56 (Figs. 3 and 5), through the gear 59, drives the type selecting drive shaft 39 and thus the latter through the variable gear drive just described is driven at a variable speed through the operating cycle of the printing mechanism. For the proper operation of the machine disclosed herein shaft 22 is driven counterclockwise as viewed in Fig. 3.

A group of type consisting of three alphabet type and one numeral type is allocated for each index point position 1–9, as shown in the code of Fig. 7. Shaft 39 is driven at a uniform speed of rotation between 120° and 270° and for each 15° four printing type (4T) past the printing line (see Fig. 9). At about 270° the speed of rotation of the shaft 39 starts to decrease so as to present four printing type past the printing line for 27°. Between 120° and 270° of the cycle of operation the roller 53 will cooperate with a substantially concentric portion of the cam race 48, and since there will be no movement of cam follower plate 46 during this period gear 56 will be driven counterclockwise at the same speed of rotation as the gear 40. When the cam follower roller 47 enters an eccentric cam portion between 270°–300° the speed of rotation of the shaft 39 is reduced so that four printing type are presented for 27°. Between 300°–345° the eccentric part of cam race 48 so reduces the speed of shaft 39 that for each 15° only one printing tooth (1T) will pass by the printing point. At 300° the alphabet type which would be selected by the O pilot hole will be adjacent the printing line. At 315° of the cycle of operation the alphabet type of the selected group selected by the X pilot hole will be in position for printing, at 330° the alphabet type selected by the R pilot hole will be in a position to print and at 345° the numeral type of the selected group will be in position to effect an imprint therefrom. Therefore, the slowing down of the speed of the rotation of shaft 39 is provided to selectively effect printing from the selected alphabet or numeral type of the selected group.

During the time that the cam follower roller 47 enters the very eccentric cam portion of cam race 48 between 300°–345°, the cam follower plate 46 under control of the cam race 48 moves outwardly (Fig. 3) with respect to the center of the shaft 37, thus, rotating the gear 56 in a clockwise direction opposite to the counterclockwise direction of rotation of the gear 40. This will result in diminishing the speed of rotation of the gear 56 and shaft 39 during the analysis of the O, X and R index point positions as just described.

After this reduction in speed of gear 56 the follower roller 47 then enters the cam portion after 345° and the latter is so designed as to move plate 46 inwardly (Fig. 3) towards the center of shaft 22 to cause gear 56 to rotate counterclockwise at a speed increased with respect to the gear 40. This increase in speed is initiated at 345° of the operating cycle and continues on over to the next operating cycle to 120° thereof. This increase in speed during such portions of successive machine cycles ensues to make up for the previous relative displacement of gear 56 so that at 120° of the cycle the gears 40 and 56 and parts driven thereby are always at the same relative position.

*Alphabet printing mechanism*

The machine is preferably provided with alphabet type and means for selecting such type so as to print, aside from numerals, letters making up words or abbreviations.

The printing mechanism shown herein is an improvement on the form fully shown and described in the patent to F. L. Fuller and H. S. Beattie, No. 2,199,561, dated May 7, 1940.

The alphabet type are selected by perforations arranged according to the code shown in Fig. 7. The particular O, X and R perforation appearing in a column determines which of the several type of a group selected by an index point will be printed. For example, if the perforation should be at the "2" hole and no pilot hole is utilized in either the O, X, or R positions, the digit 2 will be printed. If a hole is also at O such hole will select the type S; if at the X index point position, type K will be selected and if at the R position type B will be selected.

Each index point position selects a group of three non-numeral type and also a numeral type. As will be later described, if a numeral type is to be selected for printing, the printing impression will be taken at the "N" point in the machine cycle, which point is after the R index point position is analyzed (see Fig. 9, timing for "N impulse"). The alphabet type selection is provided for by taking printing impressions before the time a numeral type would have been printed and this is effected under control of the holes at O, X and R index point positions.

If the hole is at the 9 index point position alone, a printing wheel 60 (Fig. 1a) will be rotated counterclockwise until the 9 type is at the printing line and then the printing wheel 60 will be rocked by the N pulse to effect the printing impression. It will be noted that if a perforation is also at the R position, then under control of this perforation the printing wheel will be rocked earlier than for printing the digit 9 to take an imprint from the I type. The perforation at the X position will rock the printing wheel 60 to take an imprint still earlier to print R and the perforation at the O position even still earlier to print Z.

The same principle of operation is provided for selecting the type of the other groups of alphabet type and the operation of the printing mechanism for effecting type selection and printing impressions will now be described in detail.

The card is perforated with holes to represent the digits 0–9 and X, R and is passed by the analyzing brushes 17 of the card feeding mechanism previously described to analyze the index points in the order 9, 8, 7 . . . 1, 0 X and R.

Figure 9:
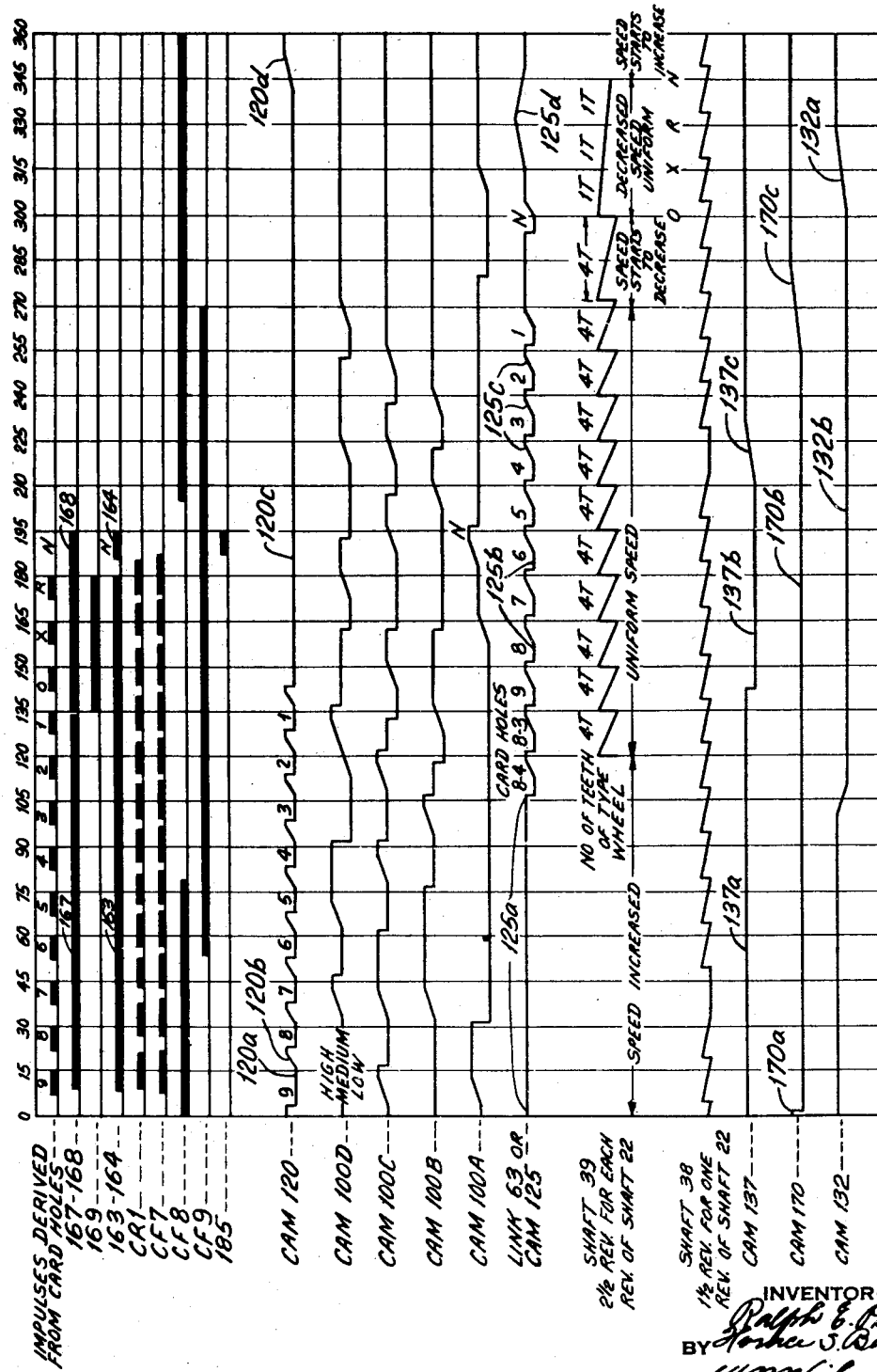
Fig. 9 is a timing diagram of the machine.

By circuits to be subsequently described, when an analyzing brush senses a hole in any of the index point positions 9–1, a circuit is closed to a printing control magnet 61 (Fig. 1b) and for each card column analyzed there is a printing control magnet. Differing from the construction shown in the patent to F. L. Fuller et al., No. 2,199,561, in which case the energization of the printing control magnet directly initiated the differential rotation of the type carrying wheel 60, in the present machine by mechanisms to be subsequently described in detail, this initiation is effected by the actuation of an operating link 63 (Fig. 1a) at a differential time. For selection of type groups determined by the holes 9–1, such operating link 63 is shifted to the left at differential times between 135–270° of the operating cycle as is shown in the timing diagram (Fig. 9). It will also be recalled that during this time shaft 39 is being rotated at a uniform speed of rotation. The shifting of the operating link 63 at differential times is provided herein to transmit a differentially timed mechanical impulse to trip the type selecting clutch shown in Fig. 1a, now to be described in detail.

For each printing order there is pivoted on a rod 66 a triple arm member consisting of arms 64, 65 and a clutch release arm 67.

Shaft 39 has secured thereto a tube 68 which is fluted transversely along its periphery to provide clutch notches 69. Tube 68 constitutes the driving clutch member. Encircling the clutch tube 68 is a plurality of gears 70, there being one gear for each order of the printing mechanism. For mounting the gears 70 on the clutch tube 68, each gear has integral therewith a flange 72. To provide for the lateral spacing between the gears 70, the gears are guided by guide slots 71 formed in guide blocks 73, 74 and 75. By such spacing members the gears 70 are separated to allow independent rotation and to also locate a clutch pawl 76 which is pivoted on the releated gear to cooperate with the clutch release arm 67. The clutch release arm 67 normally holds the clutch pawl 76 in such position that its tooth 77 is out of engagement with any of the clutch notches 69 of the clutch tube 68. When the clutch release arm 67 is rocked as a result of the actuation of the operating link 63 at a differential time, the clutch is engaged because a spring 78 attached to clutch pawl 76 will rock the latter in order that the clutch tooth 77 will engage a clutch notch 69 determined by the differential time the operating link 63 is actuated. The above described clutch is the printing type selecting clutch and causes the differential rotation of the printing wheel 60, since the gear 70 and the printing teeth of the type carrying wheel 60 are intergeared.

Figs. 1a and 1b show the arrangement of the printing devices for a single order and the machine is preferably provided with duplicate devices for printing a plurality of characters.

If the operating link 63 was shifted at about 138° as a result of a hole at the 9 index point position of the controlling column, the clutch release arm 67 would be rocked at this time and pawl 76 would be released and rocked by spring 78 so that clutch tooth 77 engages a clutch notch 69 and printing wheel 60 will thereafter continue to rotate to such position as to successively present the characters Z, R, 1 and 9 of the group selected by the 9 hole (see Fig. 7) to the printing line between 333°–345°. The differential time at which the operating link 63 is actuated determines the extent of counterclockwise rotation of the printing wheel 60 necessary to select a group of type for printing between 330°–345°. After the predetermined extent of rotation of the printing wheel 60 has been effected and the printing impression has been effected, with the type selecting clutch still engaged, the printing wheel 60 will continue to rotate until the free end of the clutch pawl 76 strikes the clutch release arm 67 which, in the meantime, has been brought to its normal position, by means of a compression spring 79 (Fig. 1a). When such disengagement is effected the printing wheel 60 is at the normal position shown in Fig. 1a.

Each printing wheel 60 is carried by an arm 81 loosely pivoted upon a rod 82 and provided with a rearwardly extending follower extension 84 which is operated by a cam projection 83 of a cam disk 85 which constitutes a driven member of a printing clutch.

Shaft 38 rotates a clutch tube 86 fixed thereto and likewise encircling the clutch tube 86 is the driven clutch disk 85 upon which is pivotally mounted a clutch pawl 87. Clutch disk 85 and parts carried thereby are guided similarly to gear 70. Associated with the clutch pawl 87 is a clutch release arm 88. When the clutch engagement is effected between the clutch pawl 87 and one of the clutch notches of the clutch tube 86, the disk 85 will be rotated in a clockwise direction, whereby the cam projection 83 will cooperate with the follower extension 84 to rock arm 81 about the rod 82 against the action of the return spring 89.

The engagement of the clutch now being described is effected at differential times when the printing control magnet 61 for each order is again energized under control of the O, X and R card controlled impulses, if one of the corresponding holes is present in the related column.

At the present time it should be understood that while the O, X and R index point positions are being analyzed, the clutch release arm 88 will be rocked to clutch release position as a result of the analysis of such holes. As a result of this clutch engagement, the cam extension 83 approaches the follower extension 84 at the time shaft 39 is rotating at a diminished speed between 330°–345°, to present the type of selected group successively to the printing line. Thus, the particular type which is to be selected from the selected group for printing will depend upon the differential time that the printing control magnet 61 receives a second impulse and, therefore, the time at which the printing clutch is engaged. If the O perforation is analyzed, the printing clutch is engaged at the earliest time so as to select the first alphabet type of the selected group. If the perforation is at the X index point position, the printing clutch is engaged at a later time when the next alphabet type of the selected group is at the printing position and obviously when the perforation is at the R index point position, the printing clutch will be engaged at a still later time when the third successive alphabet type of the selected group is at the printing position. By the engagement of the printing clutch at a differential time the desired alphabet type and the numeral type of the selected group may be selected.

When the printing clutch engagement has been effected, each cam 85 will cooperate with the related follower extension 84 to rock the associated printing arm 81 to force the printing wheel 60 against the usual inking ribbon and platen 90 around which platen is positioned the paper strip to be imprinted. As each arm 81 is rocked against the action of the spring 89, the printing wheel 60 is being rotated counterclockwise but since the printing wheel is now rolling over the gear 70, this rolling action will cause an equal and simultaneous rotation in a clockwise direction. Both of these opposite rotations will, in effect, cause the printing wheel to be immobile with respect to its rotation when it moves to the right to strike the platen 90, the type striking the platen squarely and firmly to cause a legible impression.

After the printing operation, when cam extension 83 of the cam disk 85 passes by the follower extension 84, spring 89 will now be effective to return the type wheel carrying arm 81 to normal position and the extension 84 now bears against the circular peripheral edge of the cam disk 85.

After the printing operation, since the type selecting clutch is still engaged, the printing wheel 60 continues to rotate as previously stated until the clutch pawl 76 strikes the clutch release arm 67 which, in the meantime, has been positioned to normal, thereby disengaging the type selecting clutch when the printing wheels are at normal position.

The printing clutch continues its engagement for a complete rotation of the cam 85 and the clutch disengagement is effected by the engagement of the clutch pawl 87 with the clutch release arm 88.

It has been found in practice that when the disengagement of the pawl 76 for the type selecting clutch is effected by striking the clutch release arm 67, there is a tendency of the clutch pawl 76 to rock counterclockwise about its pivotal point, unduly stretching the spring 78. To prevent this action a cushioning arrangement is provided to hold the pawl 76 and is shown partly in the lower right hand corner of Fig. 1a and more completely in Fig. 2. In a preferred arrangement this constitutes for each type selecting clutch a double arm 92. One arm cooperates with a cam portion 93 of the clutch pawl 76 and the other arm bears against a spring pressed plunger 94 inserted in an aperture 95 partly filled with oil. As the clutch pawl 76 comes around to its normal position, it will strike the clutch release arm 67, forcing its clutch tooth 77 out of the clutch notch 69 it previously engaged and the cam portion 93 of the clutch pawl 76 will strike one arm of the double arm 92, forcing the opposite end downwardly to press the plunger 94. This will force the oil out of the bottom of the recess 95 and around the plunger 94, thus providing a cushioning action on the arm 92 to restrain the clutch pawl 76 so that it cannot move too far outward.

As the free end of the clutch pawl 76 strikes the clutch arm 67 there is a tendency to cause the gear 70 to rebound counterclockwise. This action is prevented by the cooperation of a spring pressed detent 96 with a shoulder 97 of a plate 98 secured to each gear 70. When the normal position of the clutch is obtained, the detent 96 will engage the shoulder 97 to prevent such rebound and retain the clutch parts in their normal position.

A somewhat similar rebound preventing mechanism is also provided for the printing clutch which consists of a spring pressed detent 91 cooperating with the shoulder 99 of the cam disk 85.

*Translating and impulse converting arrangement*

The purpose of the above arrangement herein is to translate and convert differentially timed electrical impulses to mechanical impulses and delay the transmission of each mechanical impulse to a later point in the cycle for the purpose of selecting a group of type corresponding to the differentially timed electrical impulse transmitted by the hole or holes analyzed.

In prior printing arrangements of the general type shown herein, as exemplified in the patent to F. L. Fuller, et al., No. 2,199,561, the first electrical impulse from the card holes 9–1 was directly utilized for type group selection. Herein the converted and delayed mechanical impulse is used for the purpose of type group selection. The arrangement for one denominational order is shown in Figs. 1a, 1b, and 2.

Figure 4:
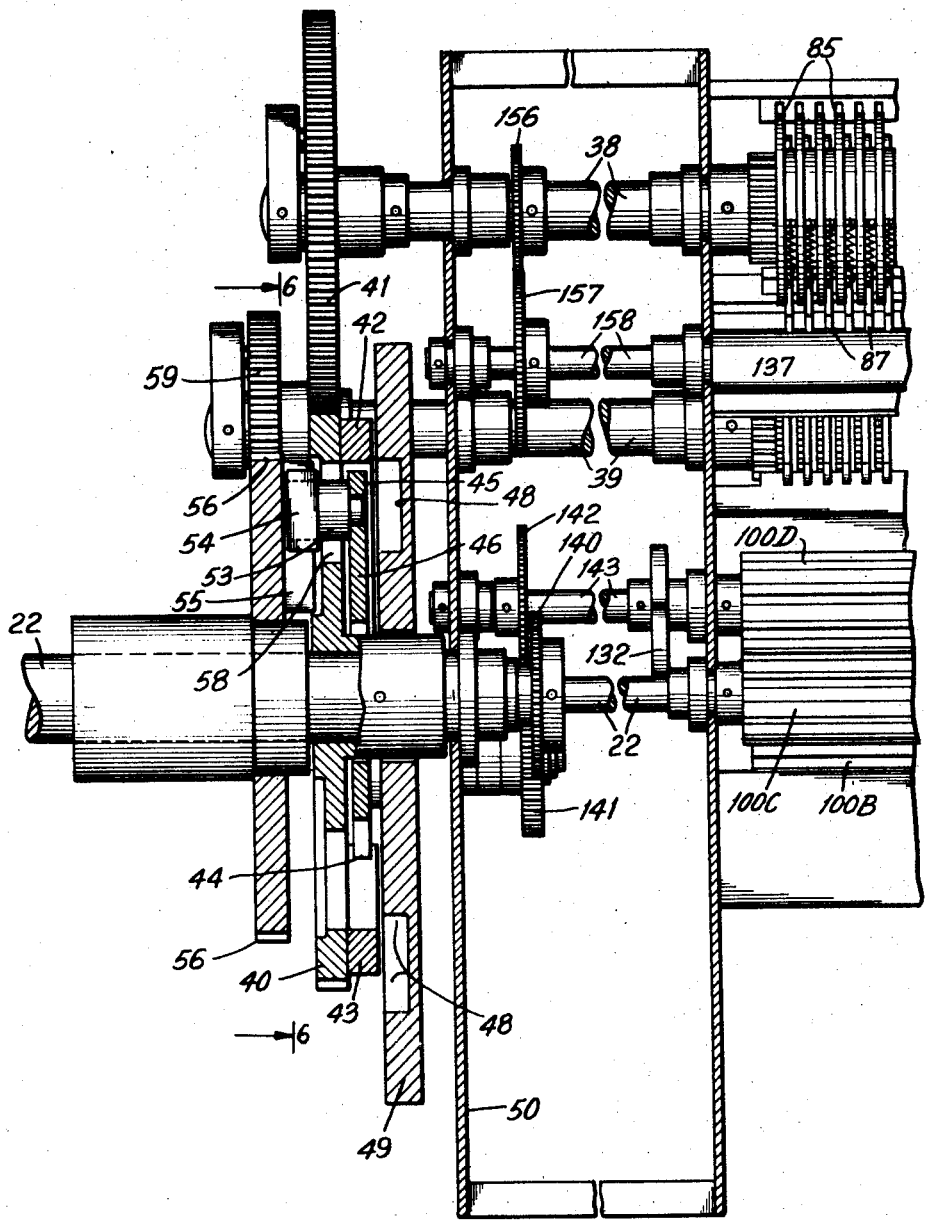
Fig. 4 is a sectional view taken on the line 4—4 of Fig. 3.
Figure 5:
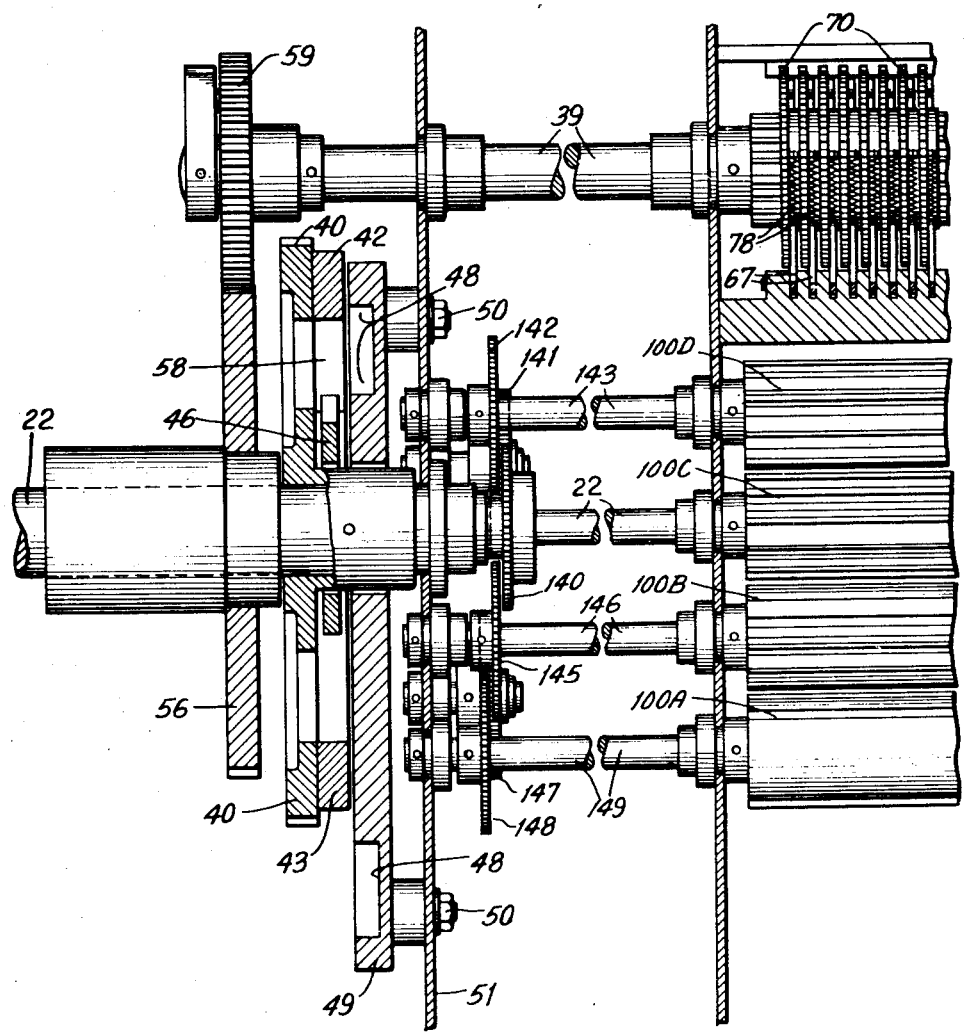
Fig. 5 is a sectional view taken on the line 5—5 of Fig. 3.

Cams 100A, 100B, 100C and 100D are driven by driving means to be subsequently described one revolution for each cycle of operation of the machine. It will be noted that these cams differ in their cam contours and the particular cam portion which is effective in each point of the operating cycle is shown in the timing diagram of Fig. 9. Each of the cams is provided with cam heights which are identified by three dotted circles associated with the cam 100A (Fig. 1b), which circles are of three different diameters and represent the heights of the cam contours as "low," "medium" and "high". The corresponding designation is shown in the timing diagram of Fig. 9 for such cams to identify the particular cam portion effective in each point of the operating cycle. The cams 100A, 100B, 100C and 100D may for convenience in construction be extended longitudinally as shown in Figs. 4 and 5 to provide fluted cam rods having the configuration and outline in Fig. 1b to cooperate with a plurality of orders.

Each cam 100 cooperates with a related releasing and blocking member 110. The reason that the member 110 is called releasing member is that when elevated a predetermined distance by the "medium" or "high" cam portion of the related cam 100 it will release the operating link 63 for movement but when in its normal lower position (due to the "low" cam portion) it will block the link 63 against movement. Each member 110 is slidably mounted in a slot 101 of a guide block 102 and is further guided by a rod 104 which receives a guide slot 103 of the related member 110. Also pivoted on a rod 105 carried by the block 102 is a latch pawl 106. Interposed between the pawl 106 and the associated member 110 is a compression spring 107, the spring 107 functioning to urge the member 110 downwardly so as to always press against and contact with the cam contour of the related cam 100. Each member 110 is provided with a shoulder 108 cooperating with a lug 109 formed as an integral part of the link 63.

The link 63, referring to Fig. 1a, is slidably mounted in guide slots formed in a support plate 111 to support the link 63 at one end and guide its movement, and referring to Fig. 1b the other end of the link 63 is dependently hung by arm 113, which arm has a cam follower extension 118. A compression spring 114 fitting in a spring support and guide block for arm 113 urges the link 63 to the left and when such spring is effective for action under control of a cam 125 it serves as the source of mechanical impulse transmitted to link 63 at a differential time to rock the clutch release arm 67 to initiate type group selection.

Recalling now that each cam 100 has cam contours of three different heights, it should be observed that when member 110 is at a position determined by the low portion of the cam 100, the shoulder 108 abuts lug 109 to block the link 63 from movement to the left, urged by compression of the spring 114. In attempting to do so lug 109 will bear against the shoulder 108 and urge the member 110 clockwise, which movement is restrained by the cooperation of an upstanding hooked portion 112 of member 110 against the latching end of the pawl 106. Assuming now that a cam has been rotated so that the "medium" cam portion of the cam contour has raised the member 110, such difference in cam height with respect to the "low" cam height will elevate shoulder 108 slightly further above the related lug 109 and by the continued cooperation of the hooked extension 112 of the member 110 with the extremity of the pawl 106, clockwise movement of the pawl 110 will be still restrained.

Assuming now that the "high" cam portion has positioned the member 110 to its maximum height, the shoulder 108 will be still further above the lug 109 and the member 110 is now in such position that the compression spring 107 will be effective to rock the member 110 clockwise so that a hooked extension 112 will catch over the latch end of pawl 106, provided that at this time the pawl 106 is rocked counterclockwise due to the concurrent analysis of a hole in the card at the time the member 110 is in its highest position. If the pawl 106 is not rocked slightly counterclockwise, no latching of the member 110 will take place. Summarizing, whenever the "high" portion of a cam has elevated a member 110 to the highest position, such member will be latched if the related pawl 106 is concurrently rocked to latching position. If there is no rocking of the pawl 106 at this time, member 110 will not be latched, and will be subsequently free to move up and down in accordance with the successive cam contour as the related cam 100 rotates.

The above description has been confined to the operation of the parts under control of the cam 100A but it should be noted that identical operations are effected under control of the remaining cams 100B, 100C and 100D. For this reason, the description of operation need not be repeated for duplicate parts.

For the purpose of rocking the pawls 106 to latch those members 110 which are at their highest position at the time a hole is sensed in the card, it will be seen that referring to Fig. 1b each printing magnet 61 when energized attracts an armature 115 and rocks the same so as to shift a related connected link 113 to the left. Depending from the link 116 are four integral extensions 117, each of which cooperates with the related pawl 106. The result of this construction is that the impulse directed to the magnet 61 will shift the link 116 and rock the four pawls 106 concurrently but only that pawl 106 is effective for latching the related member 110 if the associated member 110 has been elevated to its highest position. Therefore, one or more of the pawls 106 may be rocked idly at the same time without latching the related members 110.

To prevent the armature 115 from sticking to the core of the magnet 61 due to residual magnetism, it is desirable to provide means to positively restore the link 116 and armature 115 to normal by mechanical means timed with the rotation of the cams 100. To this end there is provided at magnet knockoff cam 120 (Fig. 1a) notched as shown. A follower arm 121 of a clutch release arm 124 cooperating with the cam 120 has a mechanical connection 122 with the link 116. At the time the magnet 61 is energized it will be observed that follower arm 121 cooperates with a notch 120a of the cam 120. Thereafter, such arm cooperates with the following cam portion 120b to rock arm 121, link 116 and armature 115, restoring the armature 115 to normal if it should remain attracted to the core under the above circumstances.

Referring now to Fig. 9, it is obvious that at the time the card holes 9–1 are analyzed, one or more cams 100 will have their "high" portions in cooperation with the latching members 110. At the time the 9 card hole is analyzed the high portions of cams 100A and 100C will be effective. At the time the 8 card hole is analyzed, only cam 100A will have a high portion effective at this time. For all of the card holes 9–1, this condition may be represented by the following table:

| Holes | Members 110 latched |
|---|---|
| 9 | 110A, 110C. |
| 8 | 110A. |
| 7 | 110B, 110C, 110D. |
| 6 | 110B, 110C. |
| 5 | 110B, 110D. |
| 4 | 110D, 110C. |
| 3 | 110B. |
| 2 | 110C. |
| 1 | 110D. |

It is obvious from the above table that members 110 are latched singly or in predetermined combinations, so that at the termination of the analysis of the card holes 9–1, some of the members 110 will be latched and others will not be latched and therefore free to be positioned according to the contour of their cams during their subsequent rotation. It is explained that once a member 110 is latched it is not free to thereafter move upwardly and downwardly in accordance with the subsequent cam contour of the related cam, but remaining unlatched members can do so.

Movement of the operating link 63 to the left during the time that the 8–3 holes are analyzed, which movement might be permitted if all of the four members 110 for this order may be either latched or elevated so as to be above the lugs 109, is restrained by a cam portion 125a of cam 125 (Fig. 1b). This cam, through driving means to be subsequently explained, is driven synchronously with the cams 100 and 120 and cooperates with the follower extension 118 of arm 113. As shown in the timing diagram, during the analysis of 8–3 holes, the high portion 125a of cam 125 will restrain movement of the operating link 63 to the left.

After latching of members 110 in predetermined combinations the contour of the cams 100A, 100B, 100C and 100D which are thereafter effective will determine the time in the operating cycle that the operating link 63 will be moved to the left in a manner now to be described in detail:

After one or more members 110 are latched in combination according to the holes analyzed as indicated in the preceding table, the further rotations of the cams 100 will raise and lower the remaining unlatched members 110 according to the cam contours of the respective cams, but during said further rotation of the cams the link 63 will be restrained against movement by one or more of such unlatched members until a point is reached in the operating cycle when the cams related to the unlatched members concurrently present cam operations of "medium" height to the unlatched members. It will be recalled that since the latched members 110 are so positioned that they do not restrain the movement of the link 63 under the influence of the spring 114 and further the elevation of any unlatched member by a cam portion of "medium" height will also unlock the link 63, it is obvious that when both of these conditions exist for four of the latches 110, the link 63 is then free to move under the influence of the spring 114 and cam 125. This will be made clear by reference to a particular example.

If, for example, the 9 hole is sensed, members 110A and 110C are latched due to the "high" cam portion of their respective cams 100A and 100C and such latching of members 110A and 110C occurs about 7½° of the operating cycle when the 9 hole is analyzed (see Fig. 9). At this time, the members 110A and 110C are latched in the highest position so that they unlock the operating link 63 at such positions. However, cams 100B and 100D in their subsequent rotation continue to raise and lower the related unlatched members 110B and 110D and one or the other of such unlatched members 110B, 110D will restrain the operating link 63 from movement until about 138° of the operating cycle, at which time both cams 110B and 110D, through their "medium" high cam portions, shift related latching members 110B and 110D to unlock the link 63. At this time cam follower extension 118 of the arm 113 will cooperate with the notch 125b designated "9" in both Fig. 1b and the timing diagram of Fig. 9. Operating link 63 is now unlocked at four points and the movement of the link to the left is effected at about 138° by spring 114. The link will now operate the clutch release arm 67 and therefore engage the type selecting clutch to initiate the rotation of the printing wheel 68 to select the group of type, 9, Z, R an I.

The type selecting clutch will be engaged at about 150° of the operating cycle and from the timing diagram (Fig. 9) the type carrying wheel 68 will rotate 4, 4, 4, 4, 4, 4, 4, 4, 4, or thirty-six teeth, and at about 300° of the operating cycle the Z type will now be in position to print. At 300° of the operating cycle, the speed of rotation of the type wheel is decreased to successively present the type of selected group in the order Z, R, I, and such type are selected for printing in accordance whether the pilot hole is O, X, or R.

Reverting now to Fig. 1b, when the operating link 63 is moved to the left to effect the engagement of the type selecting clutch the cam follower extension 118 is in the bottom of the notch 125b of the cam disk 125 and further rotation of the cam 125 in a clockwise direction will, through the following inclined cam portion 125c, cooperate with the cam follower extension 118 to positively restore the operating link 63 to the right without, however, causing the unlatching of any latched member 110. At about 330°, an extra high cam portion 125d will shift link 63 to the right beyond the Fig. 1b position, and in so doing for those members 110 which have been latched lug 109 will engage the shoulder 123 of the respective member 110 to rock the same counterclockwise to unlatching position, spring 107 being compressed during this operation to rock the pawl 106 to normal position shown in Fig. 1b. With respect to any unlatched member 110, movement of the operating link 63 to the right at this time may also effect movement of such members 110 but the operation of such is ineffective.

It is desirable to provide means to insure that the clutch release arms 67 are at their normal position and will remain so when engaged by the extremity of the clutch pawls 76 to unlatch the latter from the ratchet teeth 69. Such means now to be described is independent of the springs 79. Referring to Fig. 1b there is pivoted on a shaft 128 a plate which has fixed thereto a comb plate consisting of spring formed fingers 129 which bear against the lower extensions 65 of the clutch release arms 67. Attached to shaft 128 is a follower arm 130 carrying a roller 131, cooperating with a cam 132 secured to a drive shaft 143. From Fig. 9 it will be seen that a cam rise 132a operative at about 306° of the operating cycle is effective to cooperate with the follower roller 131 to rock the shaft 128 counterclockwise, pressing the spring fingers 129 against the related extensions 65 of the clutch release arms 67, positively retracting them to the normal position shown in Fig. 1a. Thus, it is insured that clutch release arms 67 will be in such position that they will be in the path of the free ends of the clutch pawls 76 to move them to unclutching positions.

A low portion 132b of such cam 132 is effective to enable the follower arm 130 to be rocked by a spring 133 to cooperate with such low portion 132b which releases the spring pressure on the clutch release arm 67 to free the latter for rocking to engage the type selecting clutch.

Upon analysis of such O, X, R holes through circuits to be described, the second energization of the magnet 61 again attracts its armature 115 and shifts link 116. The latter thereupon rocks the clutch release arm 124 to unlatch the clutch release arm 88 of the printing clutch. At this time a low portion 120c (see Figs. 1a and 9) of cam 120 cooperates with the cam follower extension 121 so as not to restrain the rocking of clutch release arm 124. When the clutch release arm 88 is unlatched, a depending extension 127 moves in a clearance portion 126 of said arm 124. Cam disk 83 will now rotate clockwise and the cam extension 83 will strike the follower extension 84 at the time the selected type is at the printing line to effect the printing impression.

It is undesirable to have the clutch release arm 88 released whenever link 116 is rocked the first time to rock arm 124, due to the analysis of card holes 1–9 and to this end a high portion 137a of cam 137 cooperates with arm 88 to block it against movement to release the printing clutch during the analysis of holes 1–9. When holes O, X and R are analyzed the low portion of cam 137b (see Fig. 9) will cooperate with clutch release arm 88 to permit its rocking to engage the printing clutch. After the analysis of the O, X, R holes, the cam rise 137c of cam 137 will function to positively retract the clutch release arm 88 to normal position to cause disengagement of the clutch release pawl 87 after a complete revolution of the printing clutch. At the termination of the operating cycle, a cam rise 120d of cam 120 functions to rock the clutch release arm 124 clockwise to again position it beneath the extension 135 of the clutch release arm 88, which previously has been elevated to the position shown in Fig. 1a. The cam rise 120d also shifts link 116 to restore armature 115 to normal if it should stick to the core of magnet 61.

While the operation of the machine has been described in connection with the selection of the group of type under control of the 9 card hole, the same principle of operation for effecting the above results is involved for other holes as is evident from the following table.

| Hole | Members 110 latched | Mechanical impulse at— | Cams 100 at medium cam portion |
|---|---|---|---|
| | | Degrees | |
| 9 | 110A, 110C | 138 | 100B, 100D. |
| 8 | 110A | 153 | 100B, 100C, 100D. |
| 7 | 110B, 110C, 100D | 168 | 100A. |
| 6 | 110B, 110C | 183 | 100A, 100D. |
| 5 | 110B, 110D | 198 | 100A, 100C. |
| 4 | 110C, 110D | 213 | 100B, 100A. |
| 3 | 110B | 228 | 100A, 100C, 100D. |
| 2 | 110C | 243 | 100A, 100B, 100D. |
| 1 | 110D | 258 | 100A, 100B, 100C. |

It will be recognized from this table that the concurrent position of cams 100 at a "medium" height cam portion for those cams which have not previously latched members 110, will determine the time the mechanical impulse is transmitted.

The machine includes a driving means driven by the shaft 22 for rotating the cams 100A, 100B, 100C and 100D, 120, 125, 132, and 137 in synchronous relationship and such cams are driven one complete revolution for each operating cycle.

The driving means for driving cams 100A, 100B, 100C and 100D will now be described. Secured to shaft 22 is a gear 140 (Fig. 3) which, through a gear 141, drives a gear 142 secured to the drive shaft 143 for the cam 100D and cam 132. Shaft 22 is extended, as shown in Fig. 5, to directly drive the cam 100C. Referring to Fig. 3, gear 140, through a gear 144, drives a gear 145 secured to the drive shaft 146 for cam 100B. Gear 145, through an idler gear 147, drives a gear 148 secured to the drive shaft 149 for the cam 100A.

By such driving means the cams 100A, 100B, 100C, 100D, and 132 are driven synchronously.

Referring to Fig. 3 gear 144 has rotatable therewith a gear 150 which, through an idler gear 151, drives a gear 152 attached to the shaft 153 to which the cam 125 is secured.

Gear 150 also meshes with a gear 154 secured to a shaft 155 to which shaft the cam 120 is secured.

Also referring to Fig. 3 to drive shaft 38 there is secured a gear 156 which meshes with a larger gear 157 secured to a shaft 158 to which shaft the cam 137 is secured.

Thus, through the intergearing last described, the operating cams 120, 125 and 137 are driven synchronously with the operating cams 100A, 100B, 100C and 100D.

*Operation of machine in connection with wiring diagram (Fig. 8)*

Fig. 8 illustrates the wiring diagram for a plurality of orders, each of which is wired alike for either numeric, alphabetic listing, or for printing special symbols in a manner to be later described.

The card analyzing brushes related to the selected controlling card columns terminate at plug sockets 160, and plug connections 161 are made therefrom to the plug sockets 162 of the selected printing orders for printing numerical, alphabetical or special characters.

The print control circuit is from the line 24, through CF7, CR1 circuit breaker contacts, relay contacts R3A closed during analysis of all card holes, contact roll of LB analyzing brushes 17, plug socket 160, plug connection 161, plug socket 162, cam operated contacts 163 closed during analysis of all card holes 9-1, O, X, R (see Fig. 9), print magnet 61, contacts 166, cam contacts 167 closed during analysis of 9-1 card holes, to line 23.

Thus for numeric listing digits 9-1 the above circuit is closed to energize print magnet 61 and thus through the translator and converter select the digit type 9-1. Printing of 0 in orders to the right of the significant digit 1-9 in the highest order is described in the subsequent section "Zero print control circuit."

The transmission of the N impulse to cause engagement of the printing clutch to print digits 1-9 is effected by a circuit from line 24, through contacts 164 closed at about 189° by a cam 181 driven by shaft 22 (see Fig. 9), print control magnet 61, and contacts 165 now closed in a manner which will be presently explained, to line 23. The N impulse causes the printing clutch to be engaged to initiate rotation of printing cam 85 at a time which will effect an imprint from the selected digit type 1-9, and from the 0 type in a manner to be explained later.

Contacts 165, 166 are provided for each order and are controlled by the arrangement shown in Fig. 1a for one order. Pivoted on a rod 171 is a double arm 172, 173 urged by a spring 174 so that a projection 175 of arm 172 normally rests upon a high part 170a of a cam 170. Cam 170 is secured to a shaft 176. From Fig. 3 it will be seen that to shaft 176 there is secured a gear 177 intermeshing with a gear 178 secured to the shaft 38. Thus cam 170 is driven synchronously with the other operating parts of the machine.

During the initial part of each cycle, at about 3° the counterclockwise rotation of cam 170 coordinates projection 175 with the lowest part 170b of cam 170, thus enabling spring 174 to rock arm 172, 173 slightly until the extremity of arm 173 rests upon a shoulder 179 of clutch release arm 126 but in so doing there is no change in the position of contacts 166, 165. However, whenever link 116 is shifted to the left to rock the clutch release arm 124 due to the energization of print control magnet 61 when card holes 9-1, 0, X, R are analyzed, shoulder 179 is moved away from the extremity of arm 173, and thus the action of spring 174 causes contacts 166 to open and contacts 165 to close. The low part 170b of cam 170 extends up to 255°, enabling transfer of contacts 165—166 as a result of the analysis of any of the holes 9-1, 0, X, R. After 255° a cam portion 170c of cam 170 is operative to cam arm 172, 173 to normal to again be relatched by clutch release arm 124.

It is explained that to avoid arcing at the contacts 165, 166, these contacts are so arranged as to have contacts 165 make before contacts 166 break, thus maintaining the continuity of the circuit at this point.

Contacts 166 are, of course, normally closed to enable the closure of the print circuit for type selection, and as a result of the analysis of card holes 1-9, O, X, R contacts 165 are closed at the time the N impulse is transmitted by cam operated contacts 164 to the print control magnet 61.

*Zero print control circuit*

The zero print control circuit herein is operative to cause printing of zeros at the right of the significant digit 1-9 of highest order, such as each 0 in the number 500. Obviously, when zeros are represented in card columns to the left of a significant digit 1-9, such zero printing should be suppressed. An example of the latter is the number 005, where only 5 should be printed and 0 suppressed in the tens and hundreds order.

The successive denominational orders are interconnected by plug connections 180 (Fig. 8), which is a step necessary for zero print control.

The operation in printing the number 500 will now be described. In the hundreds order, the "5" hole will be first analyzed and through the translator and converter the print wheel 60 will be initiated in rotation to select the "5" digit. Contacts 165 in this order are now closed.

In the units and tens order "0" holes are subsequently analyzed but the completion of the circuit to print control magnet 61 is different than when digit holes 1-9 are analyzed. After the 1 index point has been analyzed and before a 0 hole is analyzed, cam operated contacts 168 close and contacts 167 open. Also cam operated contacts 169 close at the same time. The impulse from the 0 hole in the units column now extends from contacts 163, through units order magnet 61, through units order contacts 166, tens order contacts 168, plug connection 180, tens order contacts 169, thence through tens order contacts 166, hundreds order contacts 168, plug connection 180, hundreds order contacts 169, hundreds order contacts 165 previously closed because of the analysis of the 5 hole in the hundreds order, to line 23. Since it is assumed that a 0 is also in the tens order the circuit extends from the print magnet 61 of such order, tens order contacts 166, hundreds order contacts 168, plug connection 180, hundreds order contacts 169, hundreds order contacts 165, to line 23.

Summarizing, the completion of a circuit to a print control magnet 61 of each lower order upon analysis of a 0 hole is dependent upon the previous analysis of a digit hole 1-9 in the next higher order. Contacts 165 related to the order of the highest significant digit may comone or more lower orders upon analysis of the 0 holes in such orders.

Hence, for such lower orders print magnet 61 is energized at about 143°, related link 116 is rocked to engage the printing clutch initiating rotation of print control cam 85. None of the latching members 110 is latched due to the fact that "high" contours of the cams 100 are not effective at this time. Hence the type selecting clutch is not engaged at this time but is later, as will be explained.

However, for all printing orders, contacts 165 are closed at the time the N impulse is transmitted by contacts 164 at about 189°.

The impulse directed to the print control magnet 61 for each order at the N impulse time will rock the latch member 110A since the associated cam 100A presents a high portion to such latch member at about 189°, which is the machine time for the N impulse.

At about 300° the remaining cams 100B, 100C, 100D associated with the remaining unlatched members 110B, 110C, 110D present medium "Height" cam portions to such unlatched members and operating link 63 is now rocked in the units, tens and hundreds orders. This operation of link 63 for the hundreds order is ineffective because the type selecting clutch of this order was previously engaged. For the units and tens order, it is evident that at 300° cam extension 83 of cam 85 is operative to rock print wheel carrying arm 81 to print from the type 0 and after the impression has been effected the type selecting clutch is engaged due to the aforesaid shifting of link 63. This will merely result in an idle complete revolution of the printing wheel 60 after printing a zero. Hence, zeros in orders to the right of the digit 1-9 in any order are automatically printed.

The manner to effect suppression of zeros in orders to the left will now be described.

Taking the number 005 as an example, printing of the digit 5 is effected by engagement of the type selecting clutch of units order to select the 5 digit type for printing. In the tens order at the time the 0 hole is analyzed the circuit extends from tens order print magnet 31, tens order contacts 166, hundreds order cam operated contacts 168 and 169 now closed (see Fig. 9) and for the tens order the circuit to tens order print control magnet 61 is broken by the hundreds order contacts 165 now open. The print magnet circuit for the hundreds order will continue from hundreds order print magnet 61, through hundreds order contacts 166 now closed, to cam operated contacts 168 pertaining to the one not used for printing, and thus broken at this point. Obviously, each zero printing circuit to the left of an order having a significant digit representation 1-9 will be incomplete. Therefore, for such orders the print wheel 60 will not be rocked and 0 printing is suppressed.

*Circuit connections for alphabet numerical, and special character listing*

For the particular card columns which are perforated to control listing of the above data when intermixed in printing a line of data, plug connections 161 are made from the associated plug sockets 160 to the plug sockets 162 of the orders selected for such type of listing. The plug connections 180 for alphabetic listing are also made, and the additional plug connection 183 for the highest order, which is the column at the extreme left. For numeral listing only plug connection 183 is omitted.

It will be recalled, referring to the code of Fig. 7, that a O, X, R hole is preceded by a digit hole 1-9. For alphabetic type group selection the circuit is from line 24, cam contacts 163 closed at 9-1, O, X, R, print magnet 61, contacts 166, cam contacts 167 closed during 9-1. After the first energization of print magnet 61 contacts 165—166 transfer in a manner previously described to close contacts 165 and open contacts 166. The second impulse under control of card holes O, X, R is then from line 24, cam contacts 163 also closed during O, X, R, print magnet 61, contacts 165 to line 23. This second energization to print magnet 61 will effect the selection of type of the selected group according to the O, X, R holes used as pilot holes.

Of course, the N impulse transmitted for numeric listing will also be transmitted to the print control magnet 61 but for alphabetic listing this is ineffective due to the previous engagement of the printing clutch when O, X, R holes are analyzed. If so desired such N impulse circuit could be rendered inoperative but since it is ineffective it is preferred that it should be included in order that circuits be alike for numeric and alphabetic listing.

*Selection of printing characters by digit holes in combination and in combination with O, X and R*

From the code in Fig. 7 it will be observed that ten numeral characters 0-9 are selected by holes appearing in a column singly and twenty-six alphabetic characters by a single digit representing hole 1-9 in combination with R, X and O. The "&" symbol is selected by digit holes 1 and 0, in combination and for this symbol the type selecting system operates in the manner previously described.

The type selecting arrangement now to be described extends the usefulness of the machine by enabling eight additional type characters to be selected by two digit holes in combination which are in combination with O, X and R or the N machine impulse. From the code shown in Fig. 7 it will be observed that card holes 8-3 in combination with O, X and R card holes, or in the absence of such O, X, R holes the N machine impulse will select four different symbols, and card holes 8-4 in the same combination with O, X, R and N will select four other different symbols.

Taking into consideration the means for selecting the group of characters when the 8-4 holes appear in combination in a controlling column, it will be evident from Fig. 9 that when the 8 hole is analyzed, member 110A will be latched and when the 4 hole is subsequently analyzed, members 110C and 110D will be latched. At about 108° of the machine cycle cam 100B associated with the unlatched member 110B will present its "medium" cam portion to such member and the link 63 will now be unlocked at four points and concurrently therewith, cam follower extension 118 of arm 113 will be aligned with the 8-4 notch of cam 125. Therefore, at this time, operating link 63 will be moved to the left, transmitting a mechanical impulse which rocks the clutch release arm 67 to initiate the rotation of the printing wheel at substantiallly 120° of the operating cycle. This will cause a rotation of the printing wheel to an extent of 44-48 teeth, successively presenting the group of ( ) . / symbols (see Fig. 1a), to the printing line.

The means for selecting symbols from such groups comprises the O, X and R card holes operating in the manner previously described. In the absence of such card holes cam operated contacts 164 transmit the N impulse at a time to engage the printing clutch which selects the / symbol. Referring to Fig. 8, in view of the similar wiring connections for each printing order, any printing order may be utilized for such symbol printing and herein is exemplified by a plug connection 161 between the column 4 plug socket 160 and plug socket 162, utilized for either numeric, alphabetic or special character printing. Upon analysis of the "8" card hole contacts 165, 166 transfer so that the second impulse upon analysis of the "4" card hole, and the third impulse uppon analysis of the O, X, R holes will energize the print control magnet 61. Due to the high part 137a of cam 137 the printing clutch will not be engaged until O, X, R holes are analyzed to thereby engage the printing clutch at a time in the operating cycle depending upon the O, X, R card hole analyzed. This will time the rocking of the print arm 81 to select the desired symbol. Obviously, in the absence of such O, X, R holes the cam contacts 164 will transmit the third impulse at about 189° of the operating cycle to the print magnet 61, thus engaging the printing clutch at a much later time in the cycle with respect to the O, X and R holes. Printing cam 85 will then be effective to rock the print arm 81 at the time the diagonal symbol is presented to the printing line.

The same printing order will cause printing of selected characters of another group whenever the 8–3 holes appear in combination and the symbols of such group are selected by the O, X, R holes in combination therewith. In the absence of O, X, R holes the N machine impulse selects a symbol. Briefly, upon analysis of the 8 hole, member 110A will be latched and upon analysis of the 3 card hole, member 110B will be latched. The cams 100C and 100D present their "medium" cam portions to their respective unlatched members 110C and 110D at 123° of the operating cycle, at which time 8–3 notch of cam 125 is correlated with the cam follower extension 118 of arm 113 (see Fig. 1b). This will enable the operating link 63 to move to the left to transmit a mechanical impulse to the clutch release arm 67 and the printing wheel 60 will be initiated in its rotation at approximately 135° of the operating cycle to rotate the printing wheel 40–44 teeth and successively present the *, ** # ¢ to the printing line. A selection of the first three symbols is determined by the presence of the card holes O, X and R and in the absence of such card holes the N machine impulse will select the ¢ symbol. The manner of selecting such symbols is similar to that previously described and it is thought unnecessary to repeat the description.

*Selection of printing characters by O, X, R holes and N machine impulse*

The print wheel 60 is provided with a group of characters 0 ¢ = $, the first three of which are selected by the O, X, R holes and the fourth or $ by the absence of such holes. The N machine impulse is used to select and effect printing from the $ character.

The mode of operation for selecting the group of such type characters and selecting individual type of such group is different from that previously described, in that there is first an initial selection of these type characters when the O, X and R holes are analyzed, and thereafter the N machine impulse causes the engagement of the printing clutch to effect the initial rotation of the printing wheel. The previous description set forth in detail the manner of selecting 0 for numeric listing and herein is repeated since it forms part of a group of special type symbols.

Cam contacts 168 close at O, X, R, N impulse times (see Fig. 9). Upon analysis of card holes O, X, R the circuit extends through cam contacts 163, print magnet 61, contacts 166, cam contacts 168, plug connection 183, cam contacts 169, to line 23. After analysis of the O, X, R holes, contacts 166, 164 transfer so that the N impulse transmitted when contacts 164 close is now directed through contacts 165 to line 23.

In the absence of any holes O, X, R, the $ symbol is selected when special plug connections to be later described are made.

At this time, the selection of the 0 ¢ = symbols by the O, X and R holes respectively will now be considered. At the time such card holes are analyzed, a low portion 137a (Fig. 1a) of cam 137 is coordinated with clutch release arm 88 to enable the impulse transmitted to the print control magnet 61 to release the clutch release arm 88 as the O, X, R holes are analyzed and initiate the rotation of the printing cam 85. However, no members 110 are latched during such analysis because none of the cams 100 present "high" portions to any latching member 110. When the O, X, R holes are analyzed, the printing cam 85 will be initiated in its rotation at a time in the operating cycle dependent upon the O, X, R hole analyzed so that the cam extension 83 will be in a position to rock the printing arm 81 at the time the related type are successively presented to the printing line. It is pointed out that for selection of 0 ¢ = symbols, rotation of the printing cam 85 will occur before the type selecting clutch is engaged.

In the absence of any digit holes 9–1 in a controlling column the N machine impulse directed by the cam operated contacts 164 after O, X, R holes are analyzed will again energize print magnet 61 to initiate the rotation of the print wheel 60 to bring the group of characters 0 ¢ = $ to the printing line in succession in the following manner: The impulse directed to the print control magnet 61 at the N impulse time will rock the latch 110A since the associated cam 100A (Fig. 9) presents a "high" portion (N) to related latching member 110A at about 189° which is the N machine impulse time. The remaining cams 100B, 100C and 100D associated with the unlatched members present "medium" height cam portions at about 294° of the operation at which time the notch N of cam 125 is aligned with the follower extension 118 of the arm 113, enabling the operating link 63 to be shifted about 294° to the left to effect engagement of the type selecting clutch at substantially 300° of the operating cycle. It should also be noted that cam 132 is in such position at the time the link 63 is shifted at 294° that a low portion 132b is presented to the follower roller 131 to enable the free rocking of the clutch release arm 67. At about 300° the print wheel will move uniformly with a decreased speed and when the selected character 0 ¢ = is presented to the printing line the previously rotated cam 85 will now be in a position to rock the printing arm 81 to effect printing of the selected character.

It is pointed out that the N machine impulse at 189° will again cause the clutch release arm 124 to be rocked but due to the previous release of the clutch release arm 88 upon analysis of the O, X and R holes, this second operation will be ineffective.

*Automatic printing of $ symbol*

The $ symbol of the group of characters now being considered can be selected in the absence of any holes in the controlling column. This automatic printing of the $ symbol is particularly useful in check writing operations where it is desirable to print such symbols automatically to the left of the highest digit of the amount on the check. For example, if the check was four denominational orders, it would be printed $24.25. If the check was for an amount only in the two lower denominational orders by suitable plug connections 184, automatic printing of this symbol would print the amount on the check as $$$.25.

To print such symbol in selected denominational orders at the left, a plug connection 184 is made so as to continue the circuit from cam contacts 168 through such plug connection 184 and cam contacts 185 to line 23. It will be noted from Fig. 9 that cam contacts 185 close at the N machine impulse time. In the absence of any holes in the controlling column at the N impulse time, a circuit will be closed from the line 24 through cam contacts 164, through the print control magnet 81, contacts 166, cam contacts 168, plug connection 184, cam contacts 185 to line 23. Understanding, as previously described, that the N machine impulse initiates the rotation of the print wheel 60 to select the group of type characters 0, ¢, =, $, in the absence of the O, X and R card holes the movement of the print wheel 60 at a uniform decreased speed will continue to finally bring the $ symbol to the printing line. Of course, if O, X and R holes are not in the controlling column, at the time the N machine impulse is transmitted to the print control magnet 81 at 189°, the link 116 will be shifted to rock the clutch release arm 124 to unlatch the clutch release arm 88. Thus, at this point in the operating cycle the printing clutch is engaged to initiate the rotation of the print cam 85 and at the time the $ symbol is presented to the printing line the cam extension 83 will be in position to engage the follower extension 84 to rock the printing arm 81 and to effect an imprint from the $ symbol. Summarizing, in the event that a controlling column has no holes, the machine impulse will select a group of type characters and concurrently select a $ type within that group.

The arrangement for automatic printing of zeros and the required suppression of such zeros for numerical listing and the simplified manner for effecting automatic $ printing which has just been described is shown and described herein to give a complete disclosure of the printing mechanism as constructed.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a printing machine controlled by records of the type having holes at digit positions 1–9, O, X, R, a rotatable printing wheel carrying several groups of alphabet type and an auxiliary group of type, means for analyzing said records, means controlled by said analyzing means and operable in response to the analysis of holes at digit positions 1–9 for effecting the rotation of said printing wheel to select a related group of alphabet type, further means operating independently of said last named means and operable in the absence of holes 1–9 to effect the rotation of said printing wheel to select said auxiliary group of type, and type selecting control means controlled by said analyzing means and operable in response to the analysis of the O, X, R holes for selecting type of the selected group of alphabet type and said auxiliary group of type when the latter is selected for operation.

2. In a machine controlled by records of the type having holes at digit positions 1–9, O, X, R, a rotatable printing wheel carrying several groups of alphabet type and an auxiliary group of type, means for analyzing said records, means controlled by said analyzing means and operable in response to the analysis of holes at digit positions 1–9 to select the related groups of alphabet type, means for effecting an impression from selected type of the selected alphabet or auxiliary group, type selecting means controlled by said analyzing means for initiating the operation of said impression effecting means at differential times according to and as the holes O, X, R are analyzed, and means operable in the absence of digit holes 1–9 for initiating and effecting the rotation of said printing wheel to select said auxiliary group of type and to cause the type of the auxiliary group to be successively positioned at the printing point as said impression effecting means is operable to effect a printing impression from the type selected by the differential time said impression effecting means is rendered operable.

3. In a machine of the class described controlled by records having holes at digit positions 1–9, O, X, R, a rotatable printing wheel carrying several groups of alphabet type and an auxiliary group of type, means for analyzing said records, means for rotating said wheel at one speed in response to the analysis of digit holes 9–1 to select a group of alphabet type, and for rotating said wheel at a reduced speed to effect printing from a selected type of the selected alphabet or auxiliary group of type according to the O, X, R holes, type selecting means controlled by said analyzing means to effect impressions from the selected type of the selected alphabet or auxiliary group according to the O, X, R holes analyzed; means operable independently of the record analyzing means and in the absence of digit holes 1–9 for initiating the rotation of said printing wheel at the time said printing wheel is being rotated at a reduced speed to successively present the type of the auxiliary group to the printing point as said type selecting means is operable according to the O, X, R hole is analyzed to effect an impression from the selected type of the auxiliary group.

4. In a printing machine controlled by records having holes at 1–9 for alphabet type group selection and holes at O, X, R for selection of alphabet type of a selected group and type of an auxiliary group, a rotatable printing wheel carrying said groups of type, means for analyzing holes of controlling records, means operable in the absence of holes 1-9 for effecting the rotation of said printing wheel to select said auxiliary group of type, type selecting means controlled by said record analyzing means for selecting certain type of said auxiliary group for printing according to the O, X, R holes analyzed, and other means operable in the absence of O, X, R holes for selecting another type of said auxiliary group for printing.

5. In a machine controlled by records having holes at index point positions 1-9, O, X, R, a rotatable printing wheel having a group of type, record analyzing means for analyzing holes of said records, means operable in the absence of holes 1-9 for effecting the rotation of said printing wheel to successively present said group of type to the printing point, and type selecting means controlled by said analyzing means to select certain of said type for printing according to the O, X, R holes analyzed and also controlled by the aforesaid means which effects the rotation of said printing wheel to select in the absence of O, X, R holes another of said type for printing.

6. In a record controlled printing machine controlled by records of the type having holes at index point positions 1-9 O, X, R, said holes appearing singly at 1-9 or in combinations, such as 8-4 for example, means for analyzing said records, a rotatable printing wheel carrying groups of alphabet type selected by holes 1-9 and an auxiliary group of type selected by holes 8-4, type group selecting means controlled by said record analyzing means including mechanical translating and converting means for transmitting a mechanical impulse subsequent to the analysis of the digit holes 1-9 or 8-4 to initiate the rotation of said printing wheel to select a group of alphabet type according to the holes 1-9 analyzed, or to select said auxiliary group of type when said holes 8-4 are analyzed, and type selecting means controlled by said record analyzing means for selecting for printing the type of the selected alphabet or auxiliary group according the O, X, R hole analyzed.

7. In a record controlled printing machine controlled by records of the type having holes at index point positions 1-9, O, X, R, said holes appearing singly at 1-9 or in combination, such as 8-4, for example, means for analyzing said records, a rotatable printing wheel carrying groups of alphabet type selected by holes 1-9 and an auxiliary group of type selected by holes 8-4, type group selecting means controlled by said record analyzing means including mechanical translating and converting means for transmitting a mechanical impulse subsequent to the analysis of the digit holes 1-9 or 8-4 to initiate rotation of said printing wheel to select a group of alphabet type according to the holes 1-9 analyzed, or to select said auxiliary group of type when said holes 8-4 are analyzed, type selecting means controlled by said record analyzing means for selecting for printing the type of the selected alphabet group and certain type of said auxiliary group according to the O, X, R holes analyzed, and further means operable in the absence of O, X, R holes for selecting for printing another type of said auxiliary group when the latter is selected by holes 8-4.

8. In a printing machine controlled by records having holes at index point positions 1-9 singly or two in combination, such as 8-4, and also O, X, R holes, means for analyzing said records, a rotatable printing wheel carrying groups of type selected by holes 1-9 and an auxiliary group of type, translating and converting means controlled by the record analyzing means to convert said combinational hole representations 8-4 to a delayed differential time equivalent, means controlled by said translating means to initiate and effect the rotation of said printing wheel to a position to select said auxiliary group of type, and type selecting means controlled by said record analyzing means and operable according to the O, X, R holes analyzed to select the related type of the auxiliary group for printing.

9. In a printing machine controlled by records having holes at index point positions 1-9 singly or two in combination, such as 8-4, and also O, X, R holes, means for analyzing said records, a rotatable printing wheel carrying groups of type selected by holes 1-9 and an auxiliary group of type, translating and converting means controlled by the record analyzing means to convert said combinational hole representations 8-4 to a delayed differential time equivalent, means controlled by said translating means to initiate and effect the rotation of said printing wheel to a position to select said auxiliary group of type, and type selecting means controlled by said record analyzing means and operable according to the O, X, R holes analyzed to select certain of the type of the auxiliary group for printing, and further means operable in the absence of O, X, R holes to select another type to the auxiliary group for printing.

10. In a machine of the class described controlled by records having holes at 1-9 index point positions singly, or in a combination such as, 8-4 for example, and type selecting holes O, X, R, means for analyzing said records, a printing wheel carrying groups of alphabet type and an auxiliary group of type, means for rotating said printing wheel, means controlled by said analyzing means including translating and converting means operable when digit holes 8-4 are analyzed to initiate the operation of said printing wheel rotating means at a differential time to rotate said printing wheel to select said auxiliary group of type, and further means operable in the absence of holes O, X, R for effecting an impression from a certain type of the auxiliary group.

11. In a printing machine in combination, a rotatable type wheel carrying groups of alphabet type, means for rotating said wheel, means for effecting a printing impression from the selected type of the selected group, means for analyzing records having type group selecting holes 1-9 and type selecting holes O, X, R, means controlled by said analyzing means to store up and provide a representation of said type group selecting holes as said holes are analyzed, means for subsequently reading out the representations of said storing means as a differentially timed equivalent to cause the initiation of operation of said rotating means to rotate said type wheel to select a group of alphabet type according to the differentially timed equivalent, for the selection of certain type groups said wheel being in rotation during the analysis of the O, X, R holes, and means controlled by said record analyzing means for initiating the operation of the impression effecting means as the O, X, R holes are being analyzed and during the rotation of the type wheel for certain type group selection to cause said impression effecting means to be subsequently operable at differential times to select a type of the selected group.

12. In a printing machine, the combination of a printing wheel having groups of alphabet type, means for electrically analyzing records bearing 1-9 type group selecting holes and type selecting holes O, X, R, a print control magnet receiving differentially timed impulses transmitted under control of said analyzing means, means to effect a printing impression from a selected type of a selected group, said means being effective at differential times dependent upon the O, X, R holes analyzed, means for rotating said printing wheel at one speed for type group selection and for rotating said printing wheel at a reduced speed in synchronous operation with said impression effecting means to enable the latter to effect an imprint from a selected type of a selected group, means controlled by said magnet for transmitting a mechanical impulse delayed to a differential time having a definite time relation to the time of the electrical impulse transmitted to said magnet upon analysis of digit holes 1-9 to said rotating means to initiate rotation of the printing wheel for type group selection, and means controlled by said magnet and the second impulse transmitted thereto in response to the analysis of the O, X, R holes to initiate the operation of said impression effecting means to cause at a subsequent differential time printing from a selected type of the selected group.

13. In a printing machine the combination of a printing wheel having groups of alphabet type, means for analyzing type group selecting holes and type selecting holes on a record, translating and converting means for translating a combination of type group selecting holes to a delayed differential time equivalent, means under control of said translating and converting means to initiate the rotation of said printing wheel from rest at a differential time dependent upon the delayed differential time equivalent to select a group of type, said rotating means including means for causing the rotation of said wheel at a reduced speed as the type of the selected group are successively positioned to a printing point, and further means operable in response to the analysis of the type selecting holes to initiate and effect printing impressions from the selected type as the printing wheel rotates at reduced speed, said further means being initiated in operation at times that overlap the rotation of the printing wheel for type group selection.

14. A translator and impulse converter for translating differentially timed electrical impulses to a delayed mechanical impulse comprising a magnet receiving said differentially timed impulses, an operating member including means to operate said member when released to transmit said mechanical impulse, a plurality of latching members controlling the release of said member, means controlled by said magnet to operate all of said latching members to latching position upon energization of said magnet by a differentially timed impulse, a plurality of cams rotatable in synchronous relationship with the transmission of differentially timed impulses to said magnet and having cam portions to position said latching members for enabling latching thereof in predetermined combinations according to the time the electrical impulse is transmitted to said magnet to operate the first named means, said latched members releasing said member at the coordinated positions, and said cams having portions subsequently operable to position the remaining unlatched members to a position to release said member at the coordinated positions, whereby the means to operate said member is then effective to transmit the delayed mechanical impulse.

15. A translator and impulse converter for translating differentially timed electrical impulses to a delayed mechanical impulse comprising a magnet receiving said differentially timed impulses, an operating member including means to operate said member when released to transmit said mechanical impulse, a plurality of latching members controlling the release of said member, a pawl for latching each member, means operated by said magnet to operate all of said latching members to latching position upon energization of said magnet by a differentially timed impulse, a plurality of cams rotatable in synchronous relationship with the transmission of differentially timed impulses to said magnet and having cam portions to position said latching members for enabling latching thereof by the related pawls in predetermined combinations according to the time the electrical impulse is transmitted to said magnet to operate the first named means, said latched members through the related latching pawls releasing said member at the coordinated positions, and said cams having other portions subsequently operable to position the remaining unlatched members to a position to release said member at the coordinated positions, whereby the means to operate said member is effective to transmit the delayed mechanical impulse, and means operable after the transmission of said impulse to shift said latched members to unlatched position.

16. A translator and impulse converter for translating differentially timed electrical impulses received under control of a perforated record to a delayed mechanical impulse comprising a magnet receiving said differentially timed impulses, means for analyzing holes of a record in succession to transmit said electrical impulse to said magnet, an operating member including means to operate said member when released to transmit said mechanical impulse, a plurality of latching members controlling the release of said member, means controlled by said magnet to operate all of said latching members to latching position upon energization of said magnet by a differentially timed impulse, a plurality of cams rotatable in synchronous relationship with the transmission of differentially timed impulses to said magnet and having cam portions to position said latching members for enabling latching thereof in predetermined combinations according to the time the electrical impulse is transmitted to said magnet to operate the related means, said latched members releasing said member at the coordinated positions, and said cams having portions subsequently operable to position the remaining unlatched members to a position to release said member at the coordinated positions, whereby the means to operate said member is effective to transmit the delayed mechanical impulse.

17. A translator and impulse converter for translating differentially timed electrical impulses to a delayed mechanical impulse comprising a magnet receiving said differentially timed impulses, an operating member operable when released to transmit said mechanical impulse, a plurality of controlling members controlling the release of said member, means controlled by said magnet to operate all of said controlling members upon energization of said magnet by a differentially timed impulse, a plurality of cams rotatable in synchronous relationship with the transmission of differentially timed impulses to said magnet and having cam portions to position said operated controlling members in predetermined combinations according to the time the electrical impulse is transmitted to said magnet for releasing said member at the coordinated positions but blocking said member at other positions, and having portions subsequently operable to position the remaining controlling members to release said member at said other positions, whereby said member is then operable to transmit the delayed mechanical impulse.

18. In a printing machine for selectively printing from one of a plurality of sets of alphabet type, means for analyzing a record having O, X, R holes and other holes in the combination 8-4, or 8-3, for example translating and converting means to convert the combinational reading to a differentially timed equivalent impulse to select a group of type, a printing wheel carrying said sets of alphabet type, means operable in response to said differentially timed equivalent impulse to initiate the rotation of said printing wheel from rest position for a predetermined extent to select a related set of alphabet type, impression effecting means, and type selecting means controlled by said analyzing means upon analysis of O, X, R holes to effect operation of the impression effecting means at differential times to effect printing from the desired type of the selecting group.

19. In a printing machine controlled by records having type group selecting holes appearing either singly or in combination at intrazone index point positions and type selecting holes at extrazone index point positions, means for analyzing said records, a rotatable printing wheel carrying groups of type, means controlled by said analyzing means to initiate and effect the rotation of said wheel to a position for selecting in accordance with holes analyzed at said intrazone index point positions and appearing singly certain groups of types, said means including translating and converting means to convert a reading from said combinationally arranged holes to a differentially timed equivalent to select other groups of type, and type selecting means controlled by said analyzing means and operable according to the extrazone holes analyzed to select the related type of the selected group for printing.

20. In a printing machine controlled by records having type group selecting holes appearing either singly or in combination at intrazone index point positions and type selecting holes at extrazone index point positions, electrical means for analyzing said records, a rotatable printing wheel carrying groups of type, means controlled by said analyzing means to initiate and effect the rotation of said wheel to a position for selecting in accordance with holes analyzed at said intrazone index point positions and appearing singly certain groups of types, and including translating and converting means to convert combinations of electrical impulses derived from combinationally arranged holes to delayed differentially timed mechanical impulses to select certain groups of types, and to transmit delayed mechanical impulses corresponding to the single electrical impulses derived from single type group selecting holes to select other groups of type, and type selecting means controlled by said analyzing means and operable according to the extrazone holes analyzed to select the related type of the selected group for printing.

21. In a printing machine controlled by records having type group selecting holes appearing either singly or in combination at intrazone index point positions and type selecting holes appearing singly at extrazone index point positions, electrical means for analyzing said records, a rotatable printing wheel carrying groups of type, means controlled by said analyzing means to initiate and effect the rotation of said wheel to a position for selecting in accordance with holes analyzed at said intrazone index point positions and appearing singly, certain groups of type, and including translating and converting means to convert combinations of electrical impulses derived from combinationally arranged holes to delayed differentially timed mechanical impulses to select certain groups of type, and to transmit delayed mechanical impulses corresponding to the single electrical impulses derived from single type group selecting holes to select other groups of type, and type selecting means comprising means controlled by said analyzing means to store up and hold a representation of the extrazone hole analyzed and to effect the transmission of a delayed mechanical impulse according to the hole analyzed to select a desired type of the selected group.

22. In a printing machine controlled by records having type group selecting holes appearing either singly or in combination at intrazone index point positions and type selecting holes appearing singly at extrazone index point positions, electrical means for analyzing said records, a rotatable printing wheel carrying groups of type, translating and converting means to convert single electrical impulses or combinations of electrical impulses derived from combinationally arranged type group selecting holes to a delayed differentially timed mechanical impulse, means controlled by said translating and converting means to initiate and effect the rotation of said wheel to a position for selecting in accordance with mechanical impulses transmitted by said transmitting and converting means said groups of type, and type selecting means controlled by said analyzing means and operable according to the extrazone holes analyzed to select the related type of the selected group for printing.

23. In a machine of the class described controlled by records having intrazone type group selecting holes arranged singly or in combination, and extrazone type selecting holes also arranged singly, means for analyzing said holes, means carrying groups of type, translating and converting means controlled by said analyzing means for converting a combinational or single reading derived from holes analyzed by said analyzing means to a delayed differentially timed mechanical impulse, type group selecting means controlled by said type group selecting mechanical impulses derived from said translating and converting means to select said groups of type, type selecting means controlled by said analyzing means to select type from the selected group, and control means to render said type selecting means inactive under control of said analyzing means on the analysis of said type group selecting intrazone holes.

24. In a machine of the type having a plurality of groups of type, a printing wheel carrying said groups of type, a print cam for moving said printing wheel to printing position, means to rotate said print cam at one speed, means to rotate said printing wheel at a higher speed, record controlled type group selecting means operable according to the type group selecting holes analyzed to cause the rotation of said printing wheel by the associated rotating means at said higher speed and for certain type groups by said type group selecting means prior to the rotation of said print cam, and other record controlled means for causing, according to the O, X, R holes, the rotation of said print cam by the associated rotating means at a slower speed with respect to said printing wheel whereby said print cam is in position to move said printing wheel to effect printing from any of the selected type groups as they arrive in position for printing.

RALPH E. PAGE.
HORACE S. BEATTIE.

REFERENCES CITED

The following references are of record in the file of this patent:

UNITED STATES PATENTS

| Number | Name | Date |
| --- | --- | --- |
| 1,909,550 | Peirce | May 16, 1933 |
| 2,157,035 | Torkelson | May 2, 1939 |
| 2,199,561 | Fuller | May 7, 1940 |